United States Patent
Tabata et al.

(10) Patent No.: US 7,549,944 B2
(45) Date of Patent: Jun. 23, 2009

(54) CONTROL APPARATUS FOR VEHICULAR DRIVE SYSTEM, VEHICLE PROVIDED WITH THE CONTROL APPARATUS, AND METHOD OF CONTROLLING VEHICULAR DRIVE SYSTEM

(75) Inventors: Atsushi Tabata, Okazaki (JP); Yutaka Taga, Aichi-gun (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 332 days.

(21) Appl. No.: 11/471,634

(22) Filed: Jun. 21, 2006

(65) Prior Publication Data
US 2007/0155584 A1 Jul. 5, 2007

(30) Foreign Application Priority Data
Jun. 22, 2005 (JP) .............................. 2005-182400

(51) Int. Cl.
*B60W 10/08* (2006.01)
(52) U.S. Cl. .................. 477/5; 477/3; 477/79; 477/180; 180/65.2; 180/65.7
(58) Field of Classification Search ........................ None
See application file for complete search history.

(56) References Cited

U.S. PATENT DOCUMENTS

| 5,378,211 A * | 1/1995 | Slicker et al. ................ 477/175 |
| 6,146,302 A | 11/2000 | Kashiwase |
| 6,835,161 B2 * | 12/2004 | Grillenberger et al. ........ 477/77 |
| 2007/0287594 A1 * | 12/2007 | DeGeorge et al. ............ 477/176 |
| 2008/0009388 A1 * | 1/2008 | Tabata et al. .................... 477/2 |

FOREIGN PATENT DOCUMENTS

| JP | 11-217025 | 8/1999 |
| JP | 2002-5204 | 1/2002 |
| JP | 2003-301731 A | 10/2003 |

* cited by examiner

*Primary Examiner*—David D. Le
(74) *Attorney, Agent, or Firm*—Oblon, Spivak, McClelland, Maier & Neustadt, P.C.

(57) ABSTRACT

A control apparatus for a vehicular drive system provided with a step-variable transmission portion operable to transmit an output of an engine to a drive wheel of a vehicle and functioning as a step-variable transmission, and an input clutch operable to permit and inhibit an input of a drive force from the engine to the step-variable transmission portion, the control apparatus including an input-clutch control portion operable to reduce a torque capacity of the input clutch, during a shifting action of the step-variable transmission portion, for limiting a torque to be transmitted to the step-variable transmission portion, to a value not larger than a predetermined value.

24 Claims, 16 Drawing Sheets

|      | C0 | C1 | C2 | B0 | B1 | B2 | B3 | SPEED RATIO | STEPPING RATIO |
|------|----|----|----|----|----|----|----|-------------|----------------|
| 1st  | ◎  | ○  |    |    |    |    | ○  | 3.357       | 1.54           |
| 2nd  | ◎  | ○  |    |    |    | ○  |    | 2.180       | 1.53           |
| 3rd  | ◎  | ○  |    |    | ○  |    |    | 1.424       | 1.42           |
| 4th  | ◎  | ○  | ○  |    |    |    |    | 1.000       | 1.42           |
| 5th  |    | ○  | ○  | ◎  |    |    |    | 0.705       | SPREAD 4.76    |
| R    |    |    | ○  |    |    |    | ○  | 3.209       |                |
| N    | ○  |    |    |    |    |    |    |             |                |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | ○ | | | | | | | |

○ ENGAGED
◎ ENGAGED FOR STEP-VARIABLE SHIFTING, AND RELEASED FOR CONTINUOUSLY-VARIABLE SHIFTING

CONTROL APPARATUS FOR VEHICULAR DRIVE SYSTEM, VEHICLE PROVIDED WITH THE CONTROL APPARATUS, AND METHOD OF CONTROLLING VEHICULAR DRIVE SYSTEM

The present application is based on Japanese Patent Application No. 2005-182400.

TECHNICAL FIELD

1. Field of the Invention

The present invention relates to a control apparatus for a vehicular drive system a step-variable automatic transmission, and more particularly to techniques for shifting shock of the vehicular drive system.

2. Discussion of Prior Art

There is generally well known a step-variable automatic transmission arranged to perform clutch-to-clutch shifting actions each effected by a releasing action of a frictional coupling device and an engaging action of another frictional coupling device, or to perform one-way clutch shifting actions each effected by using a one-way clutch. In the clutch-to-clutch shifting action in this type of step-variable automatic transmission, for example, a so-called "overlap control" is effected to control an amount of overlap of an engaging torque of the frictional coupling device in its releasing action and an engaging torque of the frictional coupling device in its engaging action. In this overlap control, engaging pressures of the frictional coupling devices being released and engaged are set according to a torque of an engine so that an amount of racing of the speed of the engine (input speed of the step-variable automatic transmission) coincides with a predetermined value, for the purpose of reducing the shifting shock or improving the shifting action as felt by the vehicle operator.

The engine torque has a periodic variation (pulsation) due to periodic cylinder ignition (combustion) or piston reciprocation. In a vehicle wherein an engine is operated in a lean-burn state of an air/fuel ratio to improve the fuel economy, a so-called "rich spike" is implemented to temporarily establish a rich-burn state of the air/fuel ratio during an operation of the engine in the lean-burn state, for permitting an NOx absorbent to absorb NOx. In the presence of the NOx absorbed by and released from the NOx absorbent as a result of the rich spike, the amount of fuel supply is increased, so that the engine torque temporarily increases (varies).

When the engine torque variation is transmitted to the step-variable automatic transmission in its shifting action, the engaging pressures of the frictional coupling devices in their releasing and engaging actions must be changed according to the engine torque variation. However, a change of the engaging pressures may deteriorate a transfer of a torque from the frictional coupling device in its releasing action to the frictional coupling device in its engaging action. If the engaging pressures are not changed to prevent a risk of the deterioration of the above-indicated torque transfer, or cannot be rapidly changed in response to the torque variation, the amount of the engine speed racing tends to be increased, or the step-variable automatic transmission tends to suffer from a so-called "tie-up" phenomenon in which the output torque is temporarily reduced, whereby the step-variable automatic transmission has a risk of shifting shock.

The known step-variable automatic transmission receives the engine torque through a fluid-operated power transmitting device such as a torque converter or a fluid coupling, which permits a difference between the engine speed and the speed of the step-variable automatic transmission, and accordingly absorbs the engine torque variation (pulsation) to some extent, or prevents direct transmission of a temporary increase (variation) of the engine torque to an input shaft of the step-variable automatic transmission, so that the shifting shock is reduced.

There is known a vehicular drive system including a differential mechanism operable to distribute an output of an engine to a first electric motor and an output shaft, and a second electric motor disposed between the output shaft of the differential mechanism and vehicle drive wheels. Patent Document 1 discloses an example of the vehicle drive system as used for a hybrid vehicle. In this hybrid vehicle drive system, the differential mechanism is constituted by a planetary gear set, for example, and a major portion of a vehicle drive force is mechanically transmitted from the engine to the drive wheels, through a differential function of the differential mechanism, while the remaining portion of the vehicle drive force is electrically transmitted through an electric path from the first electric motor to the second electric motor, so that the differential mechanism is operable as an electrically controlled continuously variable transmission. The hybrid drive system is controlled by a control apparatus, to drive the vehicle with the engine held in its optimum operating condition for improving the fuel economy.

Patent Document: JP-2003-301731 A

Generally, a continuously variable transmission is known as a device that permits improved fuel economy of the vehicle, while a gear type power transmitting device such as a step-variable automatic transmission is known a device that permits improved power transmitting efficiency. However, there is not available a power transmitting mechanism which has advantages of these two power transmitting devices. For example, the hybrid vehicle drive system disclosed in the above-identified Patent Document 1 has an electric path for transmitting an electric energy from the first electric motor to the second electric motor, that is, a transmitting path through which the electric energy is transmitted as a portion of the vehicle drive force is transmitted, so that the hybrid vehicle drive system requires the first electric motor to be large-sized as the required engine output is increased. Accordingly, the required size of the second electric motor operated by the electric energy received from the first electric motor is increased, whereby the hybrid vehicle drive system must be undesirably large-sized. Alternatively, a portion of the output of the engine is once converted into an electric energy which is then converted into a mechanical energy to be transmitted to the drive wheels, so that hybrid vehicle drive system has a risk of deterioration of the fuel economy depending upon the running condition of the vehicle, for example, during a high-speed running of the vehicle. A similar problem is encountered where the above-indicated power distributing mechanism is constituted by a transmission the speed ratio of which is electrically variable, for example, a continuously variable transmission which is so-called "an electric CVT".

As the above-described hybrid vehicle drive system, there is also well known a drive system including a step-variable automatic transmission disposed between an output member of the differential mechanism (electrically controlled continuously variable transmission) and the drive wheels, for reducing the required capacity of the second electric motor to increase a large vehicle drive torque, to thereby reduce the required size of the second electric motor. Where the hybrid vehicle drive system including the differential mechanism and the step-variable automatic transmission is not provided with a fluid-operated power transmitting device, the drive system has a risk of a shifting shock which takes place due to a variation of the engine torque during a shifting action of the step-variable automatic transmission.

In a vehicular drive system arranged to solve the problem of the hybrid vehicle drive system disclosed in the above-identified Patent Document 1, a step-variable automatic transmission may be disposed in a power transmitting path between the output member of the differential mechanism and the drive wheels. This vehicular drive system also has a risk of a shifting shock which takes place due to the engine torque variation during the shifting action of the step-variable automatic transmission.

The present invention was made in view of the background art described above. It is an object to the present invention to provide a control apparatus for a vehicular drive system including a step-variable automatic transmission, which control apparatus reduces a shifting shock of the step-variable automatic transmission.

SUMMARY OF THE INVENTION

The present inventions according to claims 1, 12 and 23 respectively provide a control apparatus for, a vehicle provided with, and a control method for, a vehicular drive system provided with (a) a step-variable transmission portion operable to transmit an output of an engine to a drive wheel of a vehicle and functioning as a step-variable transmission, and (b) an input clutch operable to permit and inhibit an input of a drive force from the engine to the step-variable transmission portion, the control apparatus and the vehicle, and the control method comprising (c) input-clutch control means for or a input-clutch control step of reducing a torque capacity of the input clutch, during a shifting action of the step-variable transmission portion, for limiting a torque to be transmitted to the step-variable transmission portion, to a value not larger than a predetermined value.

According to the inventions described above, the input-clutch control means or step reduces, during the shifting action of the step-variable transmission portion, the torque capacity of the input clutch operable to permit and inhibit the input of the drive force from the engine to the step-variable transmission portion, so that the torque to be transmitted to the step-variable transmission portion is limited to the value not larger than the predetermined value. Therefore, when the engine torque exceeds a maximum torque that can be transmitted through the input clutch, a difference of the engine torque with respect to the maximum torque is not transmitted to the step-variable transmission portion, so that an influence of the engine torque variation on the shifting action of the step-variable transmission portion is reduced. Stated differently, the input clutch operates as a limiter operable upon the engine torque variation during the shifting action of the step-variable transmission portion, making it possible to reduce the influence of the engine torque variation on the shifting action of the step-variable transmission portion. Accordingly, the shifting shock of the step-variable transmission portion during its shifting action can be reduced.

Certain examples of the invention provide a control apparatus for, a vehicle provided with, and a control method for, a vehicular drive system provided with (a) a step-variable transmission portion functioning as a step-variable transmission, and (b) an input clutch operable to permit and inhibit an input of a drive force from an engine to the step-variable transmission portion, the vehicular drive system being operable to transmit an output of the engine to a drive wheel of a vehicle, the control apparatus and the vehicle, and the control method comprising (c) input-clutch control means for or a input-clutch control step of controlling a slipping action of the input clutch during a shifting action of the step-variable transmission portion.

According to the examples described just above, the input-clutch control means or step controls, during the shifting action of the step-variable transmission portion, a slipping action of the input clutch operable to permit and inhibit the input of the drive force from the engine to the step-variable transmission portion. Therefore, when the engine torque exceeds a maximum torque that can be transmitted through the input torque, a difference of the engine torque with respect to the maximum torque is not transmitted to the step-variable transmission portion, so that an influence of the engine torque variation on the shifting action of the step-variable transmission portion is reduced. Stated differently, the input clutch operates as a limiter operable upon the engine torque variation during the shifting action of the step-variable transmission portion, making it possible to reduce the influence of the engine torque variation on the shifting action of the step-variable transmission portion. Accordingly, the shifting shock of the step-variable transmission portion during its shifting action can be reduced.

Other examples of the invention provide a control apparatus for, a vehicle provided with, and a control method for, a vehicular drive system provided with (a) a step-variable transmission portion operable to transmit an output of an engine to a drive wheel of a vehicle and functioning as a step-variable transmission, and (b) an input clutch operable to permit and inhibit an input of a drive force from the engine to the step-variable transmission portion, the control apparatus and the vehicle, and the control method being characterized by comprising (c) input clutch control means for or an input-clutch control step of enabling the input clutch to operate as a torque limiting device during a shifting action of the step-variable transmission portion.

According to the examples described just above, the input-clutch control means or step enables the input clutch operable to permit and inhibit the input of the drive force from the engine to the step-variable transmission portion, to operate as the torque limiting device during the shifting action of the step-variable transmission portion. Therefore, when the engine torque exceeds a maximum torque that can be transmitted through the input clutch, a difference of the engine torque with respect to the maximum torque is not transmitted to the step-variable transmission portion, so that an influence of the engine torque variation on the shifting action of the step-variable transmission portion is reduced. Stated from another point of view, the input clutch operates as a limiter operable upon the engine torque variation during the shifting action of the step-variable transmission portion, making it possible to reduce the influence of the engine torque variation on the shifting action of the step-variable transmission portion. Accordingly, the shifting shock of the step-variable transmission portion during its shifting action can be reduced.

In other examples of the invention, (a) the vehicular drive system further includes a continuously-variable transmission portion including a differential mechanism operable to distribute an output of the engine to a first electric motor and a power transmitting member, and a second electric motor disposed in a power transmitting path between the power transmitting member and the drive wheel of the vehicle, the continuously-variable transmission portion being operable as an electrically controlled continuously variable transmission, and (b) the step-variable transmission portion is disposed in the power transmitting path between the power transmitting member and the drive wheel. In further examples of the invention, (c) differential mechanism is provided with a differential limiting device operable to limit a differential function of the differential mechanism, for thereby limiting an operation of the continuously-variable transmission portion as the electrically controlled continuously variable transmission.

According to the examples described just above, the continuously-variable transmission portion is placed in continuously-variable shifting state in which the continuously-variable transmission portion is operable as the electrically controlled continuously variable transmission, when the differential mechanism is placed in a differential state in which the differential mechanism performs a differential function, without the differential limiting device limiting the differential function of the differential mechanism. When the differential function of the differential mechanism is limited by the differential limiting device, the operation of the continuously-variable transmission portion as the electrically controlled continuously variable transmission is limited. For example, when the differential mechanism is placed in a non-differential state, for example, in a locked state in which the differential mechanism does not perform the differential function, the continuously-variable transmission portion is placed in a step-variable shifting state in which the continuously-variable transmission portion does not perform an electrically controlled continuously variable shifting operation. Therefore, the vehicular drive system has both an advantage of improved fuel economy of a transmission the speed ratio of which is electrically variable, and an advantage of high power transmitting efficiency of a gear type power transmitting device arranged to mechanically transmit the drive force.

The fuel economy is improved when the differential portion is placed in the continuously-variable shifting state while the vehicle is running at a low or medium speed or output with the engine operating in a normal output state, for example. When the differential portion is placed in the non-continuously-variable shifting state for transmitting the engine output to the drive wheel primarily through a mechanical power transmitting path while the vehicle is running at a high speed, on the other hand, the fuel economy is improved owing to reduction of a loss of conversion between mechanical and electric energies, which would take place when the vehicular drive system is operated as the transmission the speed ratio of which is electrically variable. The differential portion is placed in the non-continuously-variable shifting state while the vehicle is running at a high output. That is, the vehicular drive system is operated as the transmission the speed ratio of which is electrically variable, only when the vehicle is running at the low or medium speed or output, making it possible to reduce the maximum amount of electric energy that can be generated by the electric motor, namely, the maximum amount of electric energy that should be supplied from the electric motor, whereby the required size of the electric motor and the required size of the vehicular drive system including the electric motor can be further reduced.

In other examples, the input-clutch control means changes an amount of reduction of the torque capacity of the input clutch, depending upon whether the operation of the continuously-variable transmission portion as the electrically controlled continuously variable transmission is limited by the differential limiting device or not. In this case, the amount of reduction of the torque capacity of the input clutch is controlled depending upon whether the continuously-variable transmission portion is placed in a continuously-variable shifting state in which the continuously-variable transmission portion is operable to perform the electrically controlled continuously variable shifting operation and in which an amount of variation of a torque to be transmitted to the power transmitting member can be reduced irrespective of the engine torque variation, or in a non-continuously-variable shifting state in which the continuously-variable transmission portion is not operable to perform the electrically controlled continuously variable shifting operation and in which the engine output is transmitted to the drive wheel primarily through a mechanical power transmitting path, so that the amount of variation of the torque to be transmitted to the power transmitting member cannot be reduced.

In further examples, the input-clutch control means changes an amount of reduction of the torque capacity of the input clutch, depending upon whether an overall speed ratio defined by the step-variable transmission portion and the continuously-variable transmission portion placed in a continuously-variable shifting state in which the continuously-variable transmission portion is operable as the electrically controlled continuously variable transmission is changed continuously or non-continuously during the shifting action of the step-variable transmission portion. In this case, the amount of reduction of the torque capacity of the input torque is controlled according to an inertia torque which changes depending upon whether the overall speed ratio has a continuous change which restricts a variation of the engine speed during the shifting action of the step-variable transmission portion, or a non-continuous change (stepping change) which causes a variation of the engine speed during the shifting action. In further examples of the invention, when the shifting action of the step-variable transmission portion causes a stepping change of speed ratio, the input clutch is slipped and the shifting action of the step-variable transmission portion is controlled. In other examples of the invention, when the shifting action of the step-variable transmission portion does not cause a stepping change of speed ratio, the input clutch is slipped and the shifting action of the step-variable transmission portion is controlled so as to maintain a speed of the engine.

In further examples, the input-clutch control means or the input-clutch control step is provided to change an amount of reduction of the torque capacity of the input clutch, according to a variation of a torque of the engine. In this case, the shifting shock of the step-variable transmission portion during its shifting action can be made smaller than where the torque transmitted by the input clutch is reduced irrespective of the engine torque.

In further examples, the input clutch is not used to effect the shifting action of the step-variable transmission portion. In this case, the step-variable transmission portion is shifted by a releasing action of a coupling device and an engaging action of another coupling device, so that the influence of the engine torque variation on the shifting action of the step-variable transmission portion is adequately reduced.

Preferably, the power transmitting path between the engine and the step-variable transmission portion is not provided with a fluid-operated power transmitting device, so that the engine is connected to the step-variable transmission portion through the input clutch. In this case, the reduction of the torque capacity of the input clutch by the input-clutch control means is more effective to educe the shifting shock of the step-variable transmission portion during its shifting action.

Preferably, the differential limiting device places the differential mechanism in a differential state in which the differential mechanism performs a differential function, to place the continuously-variable transmission portion in a continuously-variable shifting state in which the continuously-variable transmission portion is operable as the electrically controlled continuously variable transmission, and places the differential mechanism in a non-differential state, for example, a locked state in which the differential mechanism does not perform the differential function, to place the continuously-variable transmission portion in a step-variable shifting state in which the continuously-variable transmission portion is not operable as the electrically controlled continuously variable transmission. In this case, the continuously-variable transmission portion is switchable between the continuously-variable shifting state and the step-variable shifting state.

Preferably, the differential mechanism has a first element connected to the engine, a second element connected to the first electric motor and a third element connected to the power transmitting member, and the differential limiting device is operable to place the differential mechanism in the differential state in which the first, second and third elements of the differential mechanism are rotatable relative to each other, for example, in the differential state in which at least the second and third elements are rotatable at respective different speeds, and to place the differential mechanism in the non-differential state, for example, the locked state in which at least the second and third elements are not rotatable at the respective different speeds, for example, in the locked state in which the first, second and third elements are rotated as a unit or the second element is held stationary. In this case, the differential mechanism is switchable between the differential state and the non-differential state.

Preferably, the differential limiting device includes a clutch operable to connect any two of the first, second and third elements of the differential mechanism to each other for rotating the first, second and third elements as a unit, and/or a brake operable to fix the second element to a stationary member for holding the second element stationary. This arrangement permits the differential mechanism to be easily switched between the differential and non-differential states.

Preferably, the clutch and brake are released to place the differential mechanism in the differential state in which the first, second and third elements are rotatable relative to each other, and in which the differential mechanism is operable as an electrically controlled differential device, and the clutch is engaged to permit the differential mechanism to be operable as a transmission having a speed ratio of 1, or the brake is engaged to permit the differential mechanism to be operable as a speed-increasing transmission having a speed ratio lower than 1. In this arrangement, the differential mechanism is switchable between the differential state and the non-differential state, and is operable as a transmission having a single gear position with a single fixed speed ratio or a plurality of gear positions having respective fixed speed ratios.

Preferably the differential mechanism is a planetary gear set, and the first element is a carrier of the planetary gear set, and the second element is a sun gear of the planetary gear set, while said third element is a ring gear of the planetary gear set. In this arrangement, the axial dimension of the differential mechanism can be reduced, and is simply constituted by one planetary gear device.

Preferably, the planetary gear set is of a single-pinion type. In this case, the axial dimension of the differential mechanism can be reduced, and the differential mechanism is simply constituted by one planetary gear set of a single-pinion type.

Preferably, the overall speed ratio of the vehicular drive system is defined by the speed ratio of the continuously-variable transmission portion and the speed ratio of the step-variable transmission portion. In this case, the vehicle drive force can be obtained over a relatively wide range of the overall speed ratio, by utilizing the speed ratio of the continuously-variable transmission portion, so that the efficiency of the continuously-variable shifting control of the continuously-variable transmission portion is further improved. Where the step-variable transmission portion is operated as a speed reducing transmission having a speed ratio higher than 1, the output torque of the second electric motor may be lower than that of the output shaft of the transmission portion, so that the required size of the second electric motor can be reduced. The continuously-variable transmission portion placed in its continuously-variable shifting state cooperates with the step-variable transmission portion to constitute a continuously variable transmission, while the continuously-variable transmission portion placed in its step-variable shifting state cooperates with the step-variable transmission portion to constitute a step-variable transmission.

The step-variable transmission portion may be a step-variable automatic transmission. In this case, the overall speed ratio is variable in steps by a shifting action of the step-variable transmission portion, more rapidly than when the overall speed ratio is continuously variable. Accordingly, the drive system functions as a continuously variable transmission which is capable of smoothly changing the vehicle drive torque and changing the speed ratio in steps to rapidly change the vehicle drive torque.

DESCRIPTION OF PREFERRED EMBODIMENTS

The embodiments of this invention will be described in detail by reference to the drawings.

Embodiment 1

Figures 1, 2:
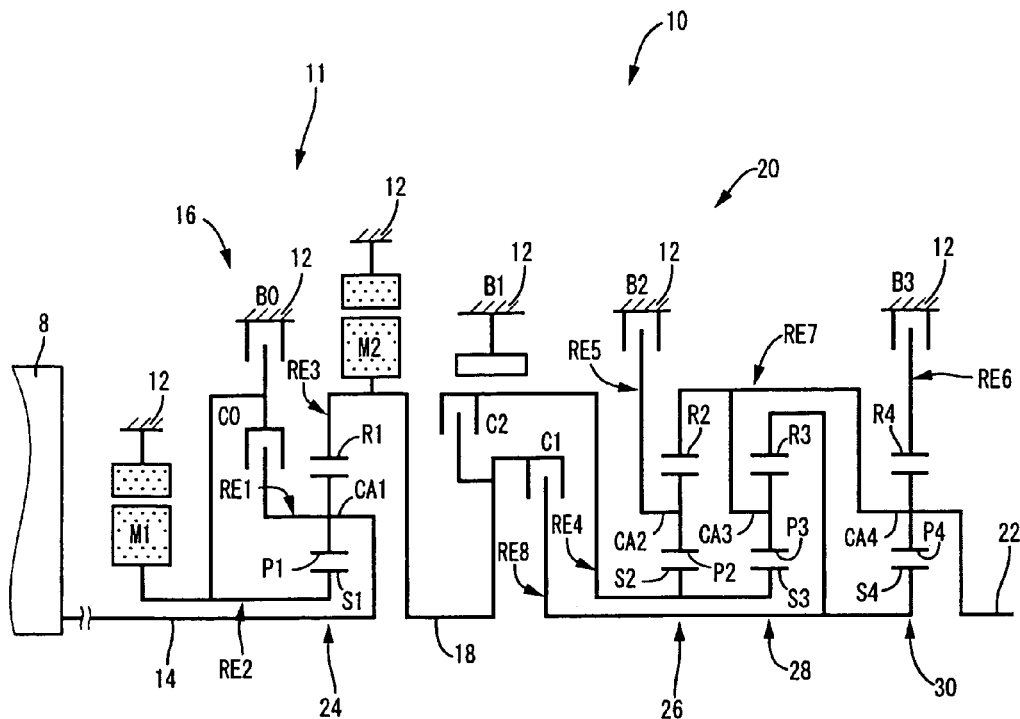
FIG. 1 is a schematic view showing an arrangement of a drive system of a hybrid vehicle, to which the present invention is applicable.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.

Referring to the schematic view of FIG. 1, there is shown a transmission mechanism 10 constituting a part of a drive system for a hybrid vehicle, which drive system is controlled by a control apparatus according to one embodiment of this invention. In FIG. 1, the transmission mechanism 10 includes: an input rotary member in the form of an input shaft 14; a differential portion 11 connected to the input shaft 14 either directly, or indirectly via a pulsation absorbing damper (vibration damping device) not shown; a step-variable transmission portion functioning as a step-variable type transmission in the form of an automatic transmission portion 20 disposed between the differential portion 11 and drive wheels 38 of the vehicle, and connected in series via a power transmitting member 18 (power transmitting shaft) to the transmission portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 (shown in FIG. 5) through a differential gear device 36 (final speed reduction gear) and a pair of drive axles. The engine 8 may be a gasoline engine or diesel engine and functions as a vehicle drive power source directly connected to the input shaft 14 or indirectly via a pulsation absorbing damper.

In the transmission mechanism 10 of the present embodiment, the engine 8 and the differential portion 11 are directly connected to each other, and the differential portion 11 and the automatic transmission portion 20 are also directly connected to each other. The direct connection means the absence of a fluid-operated power transmitting device such as a torque converter or a fluid coupling, but is interpreted to cover a connection through the above-indicated pulsation absorbing damper. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio ρ1 of about 0.418, for example, a switching clutch C0 and a switching brake B1. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, that is, are both switched to their released state, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed of the engine 8, namely, placed in the differential state in which a speed ratio γ0 (rotating speed of the input shaft 14/rotating speed of the power transmitting member 18) of the power distributing mechanism 16 is continuously changed from a minimum value γ0min to a maximum value γ0max, that is, in the continuously-variable shifting state in which the power distributing mechanism 16 functions as an electrically controlled continuously variable transmission the speed ratio γ0 of which is continuously variable from the minimum value γ0min to the maximum value γ0max.

When the switching clutch C0 or brake B0 is engaged, that is, switched into its engaged state while the power distributing mechanism 16 is placed in the continuously-variable shifting state, the power distributing mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the connecting state, that is, in the locked state in which the three rotary elements of the first planetary gear set 24 consisting of the first sun gear S1, first carrier CA1 and first ring gear R1 are rotatable as a unit, namely, placed in a non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio γ0 equal to 1.

When the switching brake B0 is engaged in place of the switching clutch C0, the first sun gear S1 is fixed to the casing 12, so that the power distributing mechanism 16 is placed in the connecting state, that is, in the locked state in which the first sun gear S1 is not rotatable, namely, placed in a second non-differential state in which the differential function is not available, so that the differential portion 11 is also placed in the non-differential state. Since the rotating speed of the first ring gear R1 is made higher than that of the first carrier CA1, the differential portion 11 is placed in the fixed-speed-ratio shifting state or step-variable shifting state in which differential portion 11 (the power distributing mechanism 16) functions as a speed-increasing transmission having a fixed speed ratio γ0 smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state (namely, non-locked state) and the non-differential state, namely, locked state (non-connecting state), that is, between the continuously-variable shifting state in which the differential portion 11 (the power distributing mechanism 16) is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios.

Stated differently, the switching clutch C0 and the switching brake B0 function as a differential limiting device operable to place the power distributing mechanism 16 in the non-differential state in which the differential function of the power distributing mechanism 16 is limited, so that the differential portion 11 is placed in the non-continuously-variable shifting state in which the operation of the differential portion 11 as an electrically controlled differential device or as an electrically controlled continuously variable transmission is limited. The switching clutch C0 and the switching brake B0 are operable to place the power distributing mechanism 16 in the differential state in which the differential function of the power distributing mechanism 16 is not limited, so that the differential portion 11 is placed in the continuously-variable shifting state in which the operation of the differential portion 11 as the electrically controlled differential device or as the electrically controlled continuously variable transmission is not limited.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

As described above, the automatic transmission portion 20 and the differential portion 11 (power transmitting member 18) are selectively connected to each other through the first clutch C1 or the second clutch C1 which is engaged to effect a shifting action of the automatic transmission portion 20. In other words, the first clutch C1 and the second clutch C2 cooperate to function as an input clutch operable to selectively inhibit or permit an input of a drive force from the differential portion 11 (power transmitting member 18) to the automatic transmission portion 20, namely, as an input clutch operable to place a power transmitting path between the engine 8 and the automatic transmission portion 20, selectively in a power transmitting state in which the drive force is transmittable from the engine 8 to the automatic transmission portion 20, and a power cut-off state in which the drive force is not transmittable from the engine 8 to the automatic transmission portion 20. That is, the above-indicated power transmitting path is placed in the power transmitting state when at least one of the first and second clutches C1m, C2 is engaged, and placed in the power cut-off state when the first and second clutches C1, C2 are released. It is noted that the automatic transmission portion 20 is a step-variable transmission which performs clutch-to-clutch shifting actions effected by a releasing action of one of the frictional coupling devices and an engaging action of another of the frictional coupling devices.

The above-described switching clutch C0, first clutch C1, second clutch C2, switching brake B0, first brake B1, second brake B2 and third brake B3 (hereinafter referred to as "clutches C" and "brakes B", unless otherwise specified) are hydraulically operated frictional coupling devices used as coupling elements in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the non-continuously-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission, while the differential portion 11 placed in the continuously-variable shifting state with the switching clutch C0 and switching brake B0 being both held in the released state cooperates with the automatic transmission portion 20 to constitute an electrically controlled continuously variable transmission. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the differential portion 11 is selectively placed in one of its step-variable and continuously-variable shifting states.

Described in detail, when the transmission mechanism 10 is placed in its step-variable shifting state with the differential portion 11 placed in the non-continuously-variable shifting state, one of a first gear position (first speed position) through a fifth gear position (fifth speed position), a reverse gear position (rear drive position) and a neural position of the automatic transmission portion 20 is selectively established by an engaging action of the switching clutch C0 or the switching brake B0, and engaging actions of selected ones of the frictional coupling devices selected from the first clutch C1, second clutch C2, first brake B1, second brake B2 and third brake B3, that is, by engaging and releasing actions of the frictional coupling devices selected to establish the selected position of the automatic transmission portion 20, for instance, by a releasing action of one of the frictional coupling devices (which is hereinafter referred to as "releasing-side coupling device") and an engaging action of another of the frictional coupling devices (which is hereinafter referred to as "engaging-side coupling device"). Thus, the speed ratio of the automatic transmission portion 20 is automatically changed. The above-indicated positions correspond to respective values of the overall speed ratio γT (input shaft speed $N_{IN}$/output shaft speed $N_{OUT}$) of the transmission mechanism 10, which values change as geometric series. The overall speed ratio γT is a total speed ratio of the transmission mechanism 10 as a whole, which is defined by the sped ratio γ0 of the differential portion 11 and the speed ratio γ of the automatic transmission portion 20.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in the table of FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by releasing all clutches C and brakes B.

Where the transmission mechanism 10 functions as the continuously variable transmission, with the differential portion 11 placed in its continuously-variable shifting state, on the other hand, the switching clutch C0 and the switching brake B0 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 (hereinafter referred to as "input speed $N_{IN}$ of the automatic transmission portion 20"), namely, the rotating speed of the power transmitting member 18 is continuously changed when the automatic transmission portion 20 is placed in each of selected at least one of the gear positions M, so that the speed ratio of the drive system when the automatic transmission portion 20 is placed in the selected gear position is continuously variable over a predetermined range. Accordingly, the overall speed ratio γT of the transmission mechanism 10 is continuously variable.

For example, when the switching clutch C0 and the switching brake B0 are both released while the transmission mechanism 10 functions as the continuously variable transmission, the input speed $N_{IN}$ of the automatic transmission portion 20 placed in a selected one of the first, second, third and fourth gear positions (and fifth gear position established by the engaging actions of the same frictional coupling devices as used to establish the fourth gear position) is continuously changed, so that the speed ratio of the drive system is continuously variable over a predetermined range, whereby the overall speed ratio γT of the transmission mechanism 10 is continuously variable.

Figure 3:
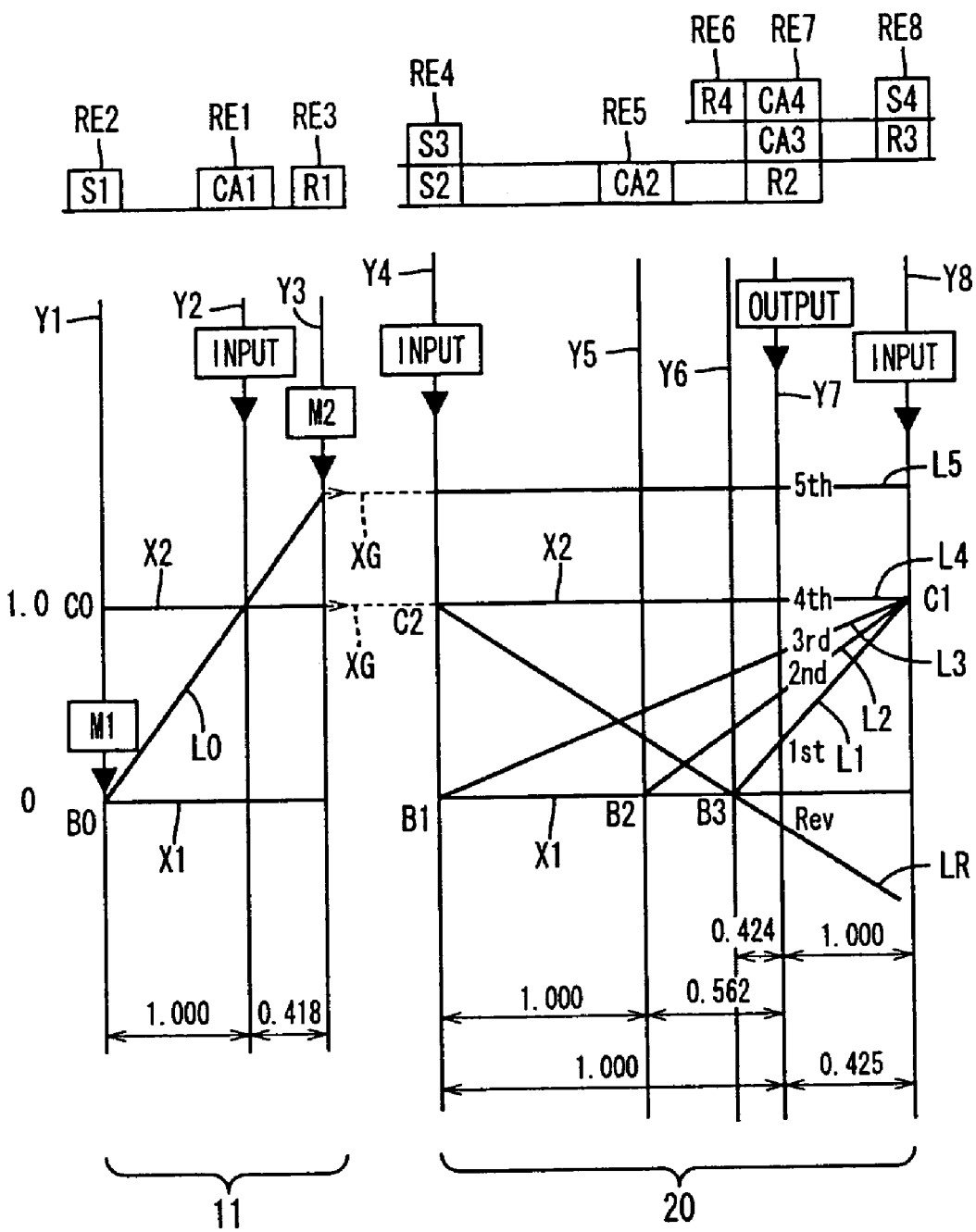
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the transmission portion (automatic transmission portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line. XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

For example, the switching clutch C0 and the switching brake B0 are released to place the transmission mechanism 10 in the continuously-variable shifting state (differential state) in which the first rotary element RE1 through the third rotary element RE3 are rotatable relative to each other, for instance, in the continuously-variable shifting state (differential state) in which at least the second rotary element RE2 and the third rotary element RE3 are rotatable at respective different speeds. In this case, the rotating speed of the first sun gear S1 represented by a point of intersection between the straight line L0 and the vertical line Y1 is raised or lowered by controlling the operating speed of the first electric motor M1, so that the rotating speed of the first carrier CA1 represented by the straight line L0 and the vertical line Y2 is raised or lowered, if the rotating speed of the ring gear R1 determined by the vehicle speed V and represented by a point of intersection between the straight line L0 and the vertical line Y3 is held substantially constant.

When the switching clutch C0 is engaged, the first sun gear S1 and the first carrier CA1 are connected to each other, and the power distributing mechanism 16 is placed in the non-differential state in which the above-indicated three rotary elements RE1, RE2, RE3 are rotated as a unit, while at least the second rotary element RE2 and the third rotary element RE3 are not rotatable at the respective different speeds. In this case, the straight line L0 is aligned with the horizontal line X2, and the power transmitting member 18 is rotated at a speed equal to the engine speed $N_E$. When the switching brake B0 is engaged, on the other hand, the first sun gear S1 is fixed to the casing 12, and the power distributing mechanism 16 is placed in the non-differential state in which at least the second rotary element RE2 and the third rotary element RE3 are not rotatable at the respective different speeds, so that the straight line L0 is inclined in the state indicated in FIG. 3, and the differential portion 11 functions as a speed increasing mechanism, whereby the rotating speed of the first ring gear R1 represented by the point of intersection between the straight lines L0 and Y3, that is, the rotating speed of the power transmitting member 18 is made higher than the engine speed $N_E$ and is transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
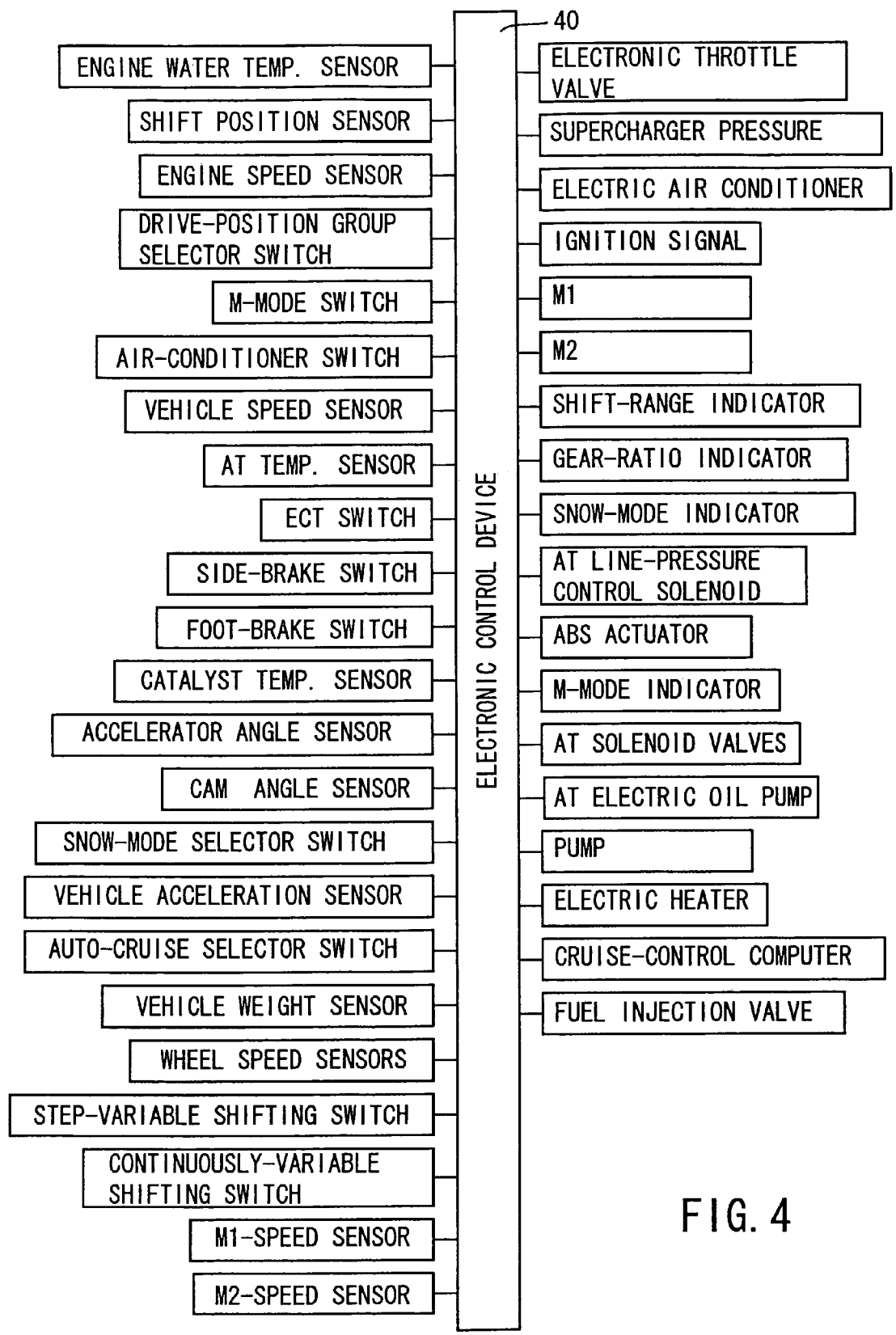
FIG. 4 is a view indicating input and output signals of an electronic control device according to one embodiment of this invention to control the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

Figure 5:
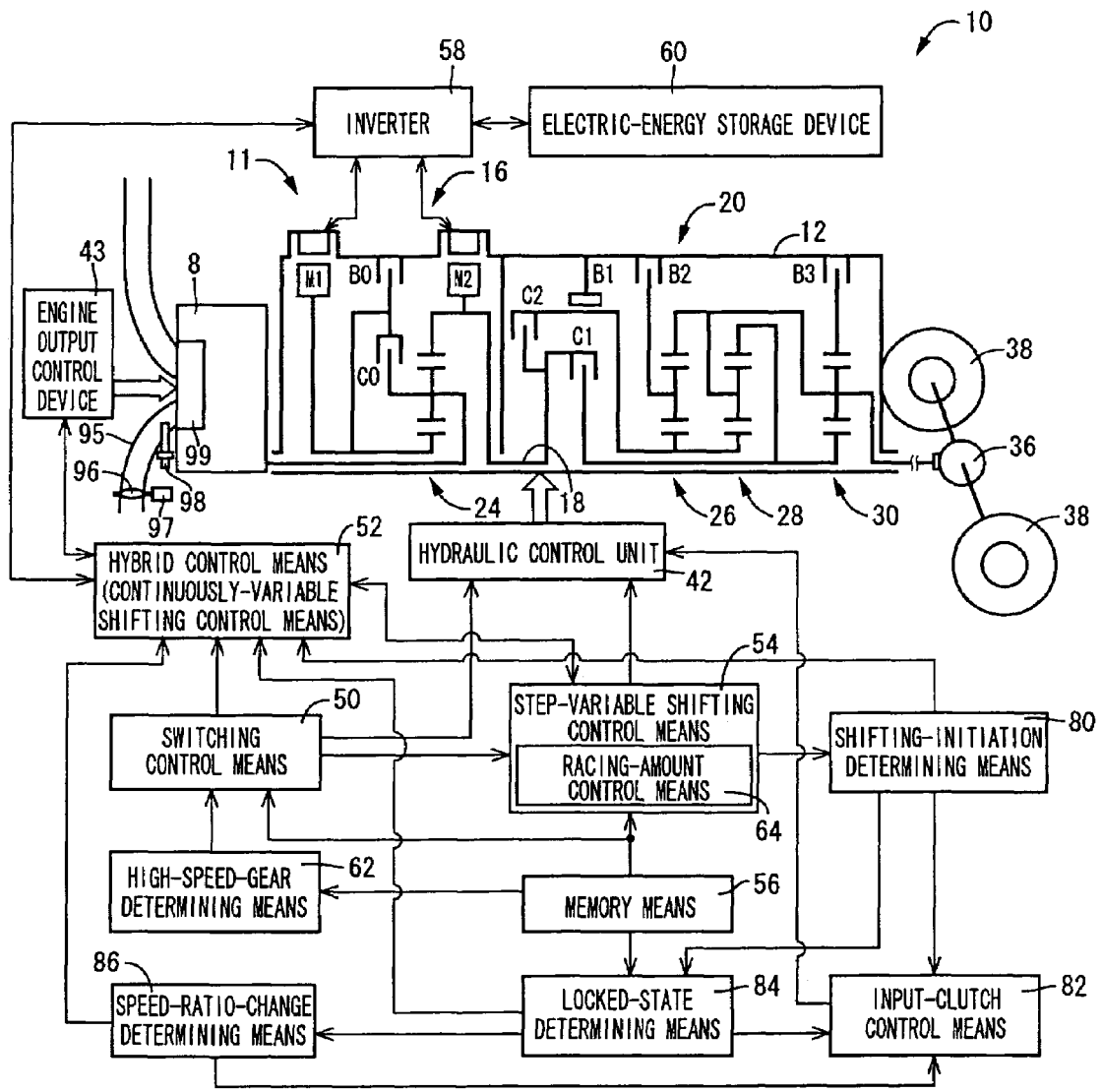
FIG. 5 is a functional block diagram illustrating major control functions of the electronic control device of FIG. 4.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (manual shifting drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the fixed-speed-ratio shifting state in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); and a signal indicative of a charging amount (a charging state) SOC of the electric-energy storage device 60 (show in FIG. 5).

The electronic control device 40 is further arranged to generate various signals such as: control signals to be applied to an engine output control device 43 (shown in FIG. 5) to control the engine output, such as a drive signal to drive a throttle actuator 97 for controlling an angle of opening $\theta_{TH}$ of an electronic throttle valve 96 provided in a suction pipe 95 of the engine, a fuel injection amount signal to control an amount of injection of a fuel by a fuel injecting device 98 into the suction pipe 95 or cylinders of the engine 8, an ignition signal to be applied to an ignition device 99 to control the ignition timing of the engine 8, and a supercharger pressure adjusting signal for adjusting a supercharger pressure of the engine 8; an air conditioner drive signal to operate the electric air conditioner; signals to operate the electric motors M1 and M2; a signal to operate a shift-range indicator for indicating the selected shift position (operating position) of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; valve drive signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a drive signal to operate an electric oil pump used as a hydraulic pressure source for the hydraulic control unit 42; a signal to drive an electric heater; and a signal to be applied to a cruise-control computer.

FIG. 5 is a functional block diagram of FIG. 5 for explaining major control functions of the electronic control device. A step-variable shifting control means (step-variable shifting control portion) 54 shown in FIG. 5 is arranged to determine whether the transmission mechanism 10 should be shifted, for example, whether a shifting action of the automatic transmission portion 20 should take place, that is, to determine the gear position to which the automatic transmission portion 20 should be shifted. This determination is made on the basis of a condition of the vehicle in the form of the vehicle speed V and an output torque $T_{OUT}$ of the automatic transmission portion 20, and according to a shifting boundary line map (shifting control map or relation) which is stored in memory means (memory portion) 56 and which represents shift-up boundary lines indicated by solid lines in FIG. 5 and shift-down boundary lines indicated by one-dot chain lines in FIG. 5. The step-variable shifting control means 54 generates commands (shifting commands; hydraulic commands) to be applied to the hydraulic control unit 42, to selectively engage and release the respective two hydraulically operated frictional coupling devices (except the switching clutch C0 and brake B0), that is, release the releasing-side coupling device and engage the engaging-side coupling device, for establishing the determined gear position of the automatic transmission portion 20 according to the table of FIG. 2. According to the commands, the hydraulic control unit 42 operates the solenoid-operated valves incorporated in the hydraulic control unit2 42, to operate the hydraulic actuators for releasing the releasing-side coupling device and engaging the engaging-s-side coupling device.

A hybrid control means (hybrid control portion) 52 functions as continuously-variable shifting control means and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio $\gamma 0$ of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the operating amount $A_{CC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the transmission portion 20. That is, the hybrid control means 52 determines a target value of the overall speed ratio $\gamma T$ of the transmission mechanism 10, so that the engine 8 is operated according to a stored highest-fuel-economy curve (fuel-economy map or relation) stored in memory means and indicated by broken line in FIG. 7. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control means 52 controls the speed ratio $\gamma 0$ of the differential portion 11, so as to obtain the target value of the overall speed ratio $\gamma T$, so that the overall speed ratio $\gamma T$ can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

It is noted in particular that the automatic transmission portion 20 is shifted under the control of the step-variable shifting control means 54, to change its speed ratio in steps, whereby the overall speed ratio γT of the transmission mechanism 10 is changed in steps. Namely, the overall speed ratio γT of the transmission mechanism 10 is changed during a shifting action of the automatic transmission portion 30, in steps or non-continuously, rather than continuously as in a continuously variation transmission the speed ratio of which is continuously changed. A stepping change of the overall speed ratio γT makes it possible to change the vehicle drive torque more rapidly, than a continuous change of the overall speed ratio γT. On the other hand, the stepping change of the overall speed ratio γT has a risk of a failure to control the engine speed $N_E$ along the highest fuel-economy curve and consequent deterioration of the fuel economy.

In view of the facts indicated above, the hybrid control means 52 is arranged to control the speed ratio of the differential portion 11 in synchronization with a shifting action of the automatic transmission portion 20, so as to reduce an amount of stepping change of the overall speed ratio γT during the shifting action of the automatic transmission portion 20, that is, to assure a continuous transient change of the overall speed ratio γT during the shifting action of the automatic transmission portion 20. In other words, the hybrid control means 52 is arranged to control the speed ratio of the differential portion 11 in synchronization with the shifting action of the automatic transmission portion 20, so as to reduce the amount of variation of the engine speed $N_E$ due to an electric CVT function (differential function) of the differential portion 11 during the shifting action of the automatic transmission portion 20.

Described in detail, the hybrid control means 52 controls the speed ratio of the differential portion 11 in synchronization with the shifting action of the automatic transmission portion 20, such that the amount of variation of the engine speed $N_E$ is held smaller than a predetermined threshold $N_E'$, irrespective of a variation of the rotating speed of the power transmitting member 18 (second electric motor M2) due to the shifting action of the automatic transmission portion 20, that is, irrespective of a variation of the input speed $N_{IN}$ of the automatic transmission portion 20. The predetermined threshold $N_E'$ is obtained by experimentation and stored in memory, as a target value of the amount of variation of the engine speed $N_E$, which is used to control the speed ratio γ0 of the differential portion 11 and below which the overall speed ratio γT is considered to be continuously changed during the shifting action of the automatic transmission portion 20.

For instance, the hybrid control means 52 is arranged to change the speed ratio γ0 of the differential portion 11 in a direction opposite to the direction of change of the speed ratio γ of the automatic transmission portion 20, by an amount equal to the amount of change of the speed ratio γ in steps, in synchronization with the shifting action of the automatic transmission portion 20, so as to prevent a non-continuous transient change of the overall speed ratio γT during the shifting action of the automatic transmission portion 20, that is, so as to hold the engine speed $N_E$ substantially constant during the shifting action of the automatic transmission portion 20, for thereby permitting a continuous change of the overall speed ratio γT. This arrangement is effective to reduce the amount of stepping change of the engine speed $N_E$ during the shifting action of the automatic transmission portion 20, for thereby reducing the shifting shock, in spite of the stepping change of the speed ratio γ of the automatic transmission portion 20 due to the shifting action. Thus, the hybrid control means 52 functions as electric motor control means for controlling the first electric motor speed $N_{M1}$, so as to prevent a variation of the engine speed $N_E$ during the shifting action of the automatic transmission portion 20, irrespective of a variation of the rotating speed of the power transmitting member 18 (hereinafter referred to as "transmitting member speed $N_{18}$")

Figure 7:
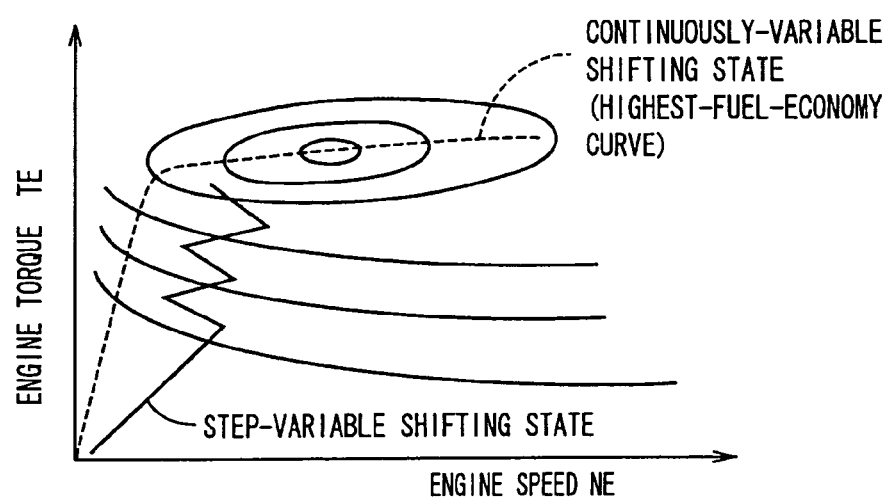
FIG. 7 is a view illustrating an example of a fuel consumption map defining a highest-fuel-economy curve of an engine, and explaining a difference between an operation of the engine in a continuously-variable shifting state (indicated by broken line) of the transmission mechanism and an operation of the engine in a step-variable shifting state (indicated by one-dot chain line) of the transmission mechanism.

Described from another point of view, the engine 8 is generally operated with a step-variable transmission, following a one-dot chain line indicated in FIG. 7, and with a continuously variable transmission, following the highest-fuel-economy curve indicated by broken line in FIG. 7, or following a line closer to the highest-fuel-economy curve, than when the engine 8 is operated with the step-variable transmission. Accordingly, the engine torque $T_E$ for obtaining the required vehicle drive torque (drive force) is obtained at the engine speed. $N_E$ which is closer to the highest-fuel-economy curve, when the engine 8 is operated with the continuously variable transmission than when it is operated with the step-variable transmission. This means that the continuously variable transmission permits a higher degree of fuel economy that the step-variable transmission. Therefore, the hybrid control means 52 is arranged to control the speed ratio γ of the differential portion 11 such that the engine 8 is operated following the highest-fuel-economy line indicated by the broken line in FIG. 7, for preventing deterioration of the fuel economy, in spite of a change of the speed ratio of the automatic transmission portion 20 in steps during its shifting action. This arrangement enables the transmission mechanism 10 as a whole to function as a continuously variable transmission, thereby assuring an improved fuel economy.

As described above, the hybrid control means 52 is arranged to implement a so-called "synchronous speed ratio control" of the differential portion 11 in synchronization with the shifting action of the automatic transmission portion 20. This synchronous speed ratio control is initiated at a moment which is determined by taking account of a response delay from a moment of determination by the step-variable control means 54 of a shifting action of the automatic transmission portion 20 to a moment of initiation of an actual change of the transmitting member speed $N_{18}$ caused by operations of the appropriate hydraulically operated frictional coupling devices, namely, a response delay up to a moment of initiation of a so-called "inertia phase" in which the input speed $N_{IN}$ of the automatic transmission portion 20, that is, the transmitting member speed $N_{18}$ changes in the process of the shifting action of the automatic transmission portion 20. For example, the response delay is obtained by experimentation and stored in memory. Alternatively, the hybrid control means 52 initiates the synchronous speed ratio control of the differential portion 11 at a moment of detection of initiation of an actual change of the input speed $N_{IN}$ of the automatic transmission portion 20.

The synchronous speed ratio control of the differential portion 11 is terminated at a moment of termination of the inertia phase of the shifting action of the automatic transmission portion 20. For example, the duration of the shifting action of the automatic transmission portion 20 may be obtained by experimentation and stored in memory. Alternatively, the hybrid control means 52 may terminate the synchronous speed ratio control of the differential portion 11 when a change of the transmitting member speed $N_{18}$ is stopped, that is, when the actual transmitting member speed $N_{18}$ has become equal to a value corresponding to the gear position established by the shifting action.

As described above, the hybrid control means 52 implements the synchronous speed ratio control of the differential portion 11, during the time period of the inertia phase in the process of the shifting action of the automatic transmission portion 20, for example, during a time period obtained by experimentation, or during a length of time from the moment of initiation of the actual change of the transmitting member speed $N_{18}$ to the moment of detection of zeroing of the actual change of the transmitting member speed $N_{18}$. In other words, the hybrid control means 52 controls the speed ratio of the differential portion 11 in the inertia phase of the automatic transmission portion 20, such that the control of the speed ratio of the differential portion 11 is effected in synchronization with the shifting action of the automatic transmission portion 20.

The hybrid control means 52 is further arranged to control the first electric motor speed $N_{M1}$ and/or the second electric motor speed $N_{M2}$, by using the electric CVT function of the differential portion 11, for thereby holding the engine speed $N_E$ constant or changing the engine speed $N_E$ to a desired value, irrespective of whether the vehicle is stationary or running. In other words, the hybrid control means 52 is capable of controlling the first electric motor speed $N_{M1}$ and/or the second electric motor speed $N_{M2}$, while holding the engine speed $N_E$ constant or changing the engine speed $N_E$ to the desired value.

When the engine speed $N_E$ is raised during running of the vehicle, for example, the hybrid control means 52 raises the first electric motor speed $N_{M1}$, while holding substantially constant the second electric motor speed $N_{M2}$ which is influenced by the vehicle speed V (speed of the drive wheels 38), as is apparent from the collinear chart of FIG. 3. When the engines peed $N_E$ is held substantially constant during the shifting action of the automatic transmission portion 20, on the other hand, the hybrid control means 52 changes the first electric motor speed $N_{M1}$ in a direction opposite to the direction of change of the second electric motor speed $N_{M2}$ due to the shifting action of the automatic transmission portion 20, while holding the engine speed $N_E$ substantially constant.

The hybrid control means 52 includes engine output control means functioning to generate commands for controlling the engine output control device 43 to control the engine 8 so as to provide a required output, by controlling the throttle actuator to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control means 52 is basically arranged to control the throttle actuator on the basis of the operating amount $A_{CC}$ of the accelerator pedal 45 and according to a predetermined stored relationship (not shown) between the operating amount $A_{CC}$ and the opening angle $\theta_{TH}$ of the electronic throttle valve such that the opening angle $\theta_{TH}$ increases with an increase of the operating amount $A_{CC}$. According to the commands received from the hybrid control means 52, the engine output control device 43 controls the throttle actuator 97 for opening and closing the electronic throttle valve 96, controls the fuel injecting device 98 for controlling the amount of fuel injection, and controls the ignition device 99 for controlling the ignition timing.

Figure 6:
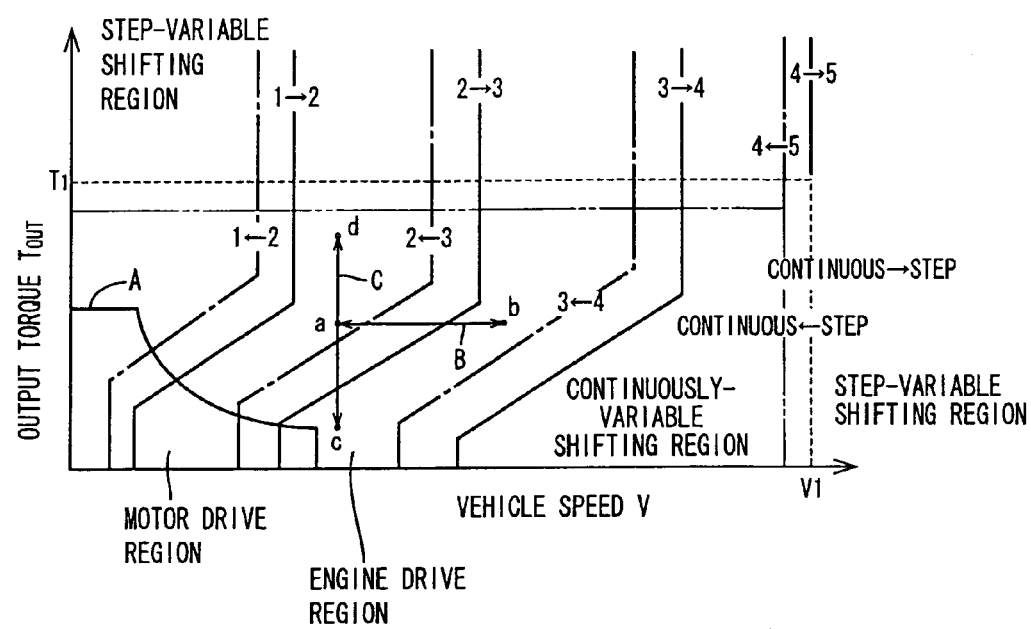
FIG. 6 is a view illustrating an example of a stored shifting boundary line map used for determining a shifting action of an automatic transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 52 is capable of establishing a motor-drive mode to drive the vehicle by the electric motor, by utilizing the electric CVT function (differential function) of the differential portion 11, irrespective of whether the engine 8 is in the non-operated state or in the idling state. Solid line A in FIG. 6 represents an example of a boundary line defining an engine-drive region and a motor-drive region, for switching the vehicle drive power source for starting and driving the vehicle (hereinafter referred to as "drive power source"), between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 6, as a result of an increase of the required output torque $T_{OUT}$ or engine torque $T_E$ due to an operation of the accelerator pedal, the vehicle may be started in the engine-drive mode.

For reducing a dragging of the engine 8 in its non-operated state and improving the fuel economy in the motor-drive mode, the hybrid control means 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control means 52 is further capable of performing a so-called "torque assisting operation" to assist the engine 8, even when the vehicle condition is in the engine-drive region, by supplying an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine-drive mode. It is noted that the torque assisting operation by the second electric motor M2 may b performed in the motor drive mode, so as to increase the output torque of the second electric motor M2.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to place the first electric motor M1 in the non-load state, by cutting off a drive current to be supplied from the electric-energy storage device 60 to the first electric motor M1 through the inverter 58. The first electric motor M1 placed in its non-load state is permitted to be freely rotated, that is, rotated under no load. In this non-load state, the differential portion 11 is placed in a state in which the differential portion 11 cannot transmit a torque, that is, in a state equivalent to a state in which the power transmitting path is cut off in the differential portion 11 and the differential portion 11 cannot produce an output. That is, the hybrid control means 52 functions electric motor control means (electric motor control portion) for placing the first electric motor M1 in its non-load state, to thereby place the differential portion 11 in its neutral state in which the power transmitting path is electrically cut off.

The high-speed-gear determining means (high-speed-gear determining portion) 62 is arranged to determine whether the gear position to which the transmission mechanism 10 should be shifted on the basis of the vehicle condition and according to the shifting boundary line map stored in the memory means 56 and indicated in FIG. 6 by way of example is a high-speed-gear position, for example, the fifth gear position. Alternatively, the high-speed-gear determining means is arranged to determine whether the gear position of the transmission mechanism 10 selected by the step-variable shifting control means 54 is the high-speed-gear position.

The switching control means 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control means 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory means 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. Thus, the switching control means 50 functions as differential limiting means for controlling the engaging and releasing actions of the switching clutch C0 or switching brake B0 to place the differential portion 11 in the non-continuously-variable shifting state, for thereby limiting the function of the differential portion 11 as an electrically controlled differential device, that is, as an electrically controlled continuously variable transmission.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, the switching control means 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control means 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the differential portion 11 operable as the auxiliary transmission is placed in a selected one of two gear positions under the control of the switching control means 50 while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, the switching control means 50 commands the hydraulic control unit 42 to release both of the switching clutch C0 and brake B0, for placing the differential portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the automatic transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20, namely, the transmitting member speed $N_{18}$ when the automatic transmission portion 20 is placed in one of the first through fourth gear positions is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 6 will be described in detail. The shifting boundary line map (shifting control map or relation) shown in FIG. 6 by way of example and stored in the memory means 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. That is, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 6 also shows two dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 determines whether the actual vehicle speed V that is a parameter representative of the vehicle condition has exceeded the predetermined upper limit value V1, for example, and engages the switching brake B0, for example, when the actual vehicle speed V has exceeded the predetermined upper limit value V1, for thereby switching the transmission mechanism 10 to the step-variable shifting state. The switching control means 50 further determines whether the output torque $T_{OUT}$ of the automatic transmission portion 20 that is also a parameter representative of the vehicle condition has exceeded the predetermined the predetermined upper limit value T1, for example, and engages the switching clutch C0, for example, when the output torque $T_{OUT}$ has exceeded the predetermined upper limit value T1, for thereby switching the transmission mechanism 10 to the step-variable shifting state.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures. In this case, for example, the switching control means determines whether any failure or functional deterioration of electric control components such as the electric motors for operating the differential portion 11 as the electrically controlled continuously variable transmission has taken place, and switches the transmission mechanism 10 to the step-variable shifting state if it is determined that any failure or functional deterioration has taken place.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously variable shifting state while the vehicle is in the high-speed running state. Namely, in the high-speed running state, the transmission mechanism 10 is effectively utilized as a planetary gear type step-variable transmission which does not have an electric path and which has high power transmitting efficiency.

On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle. Alternatively, the upper output-torque limit T1 is determined to place the transmission mechanism 10 in the step-variable shifting state in the high-output running state of the vehicle, in view of the vehicle operator's stronger desire for a high shifting response with a rapid change of the engine speed, rather than an improvement in the fuel economy, in the high-output running of the vehicle. That is, the transmission mechanism 10 is desirably operated as a step-variable transmission rather than as a continuously-variable transmission, in the high-output running of the vehicle.

Figure 8:
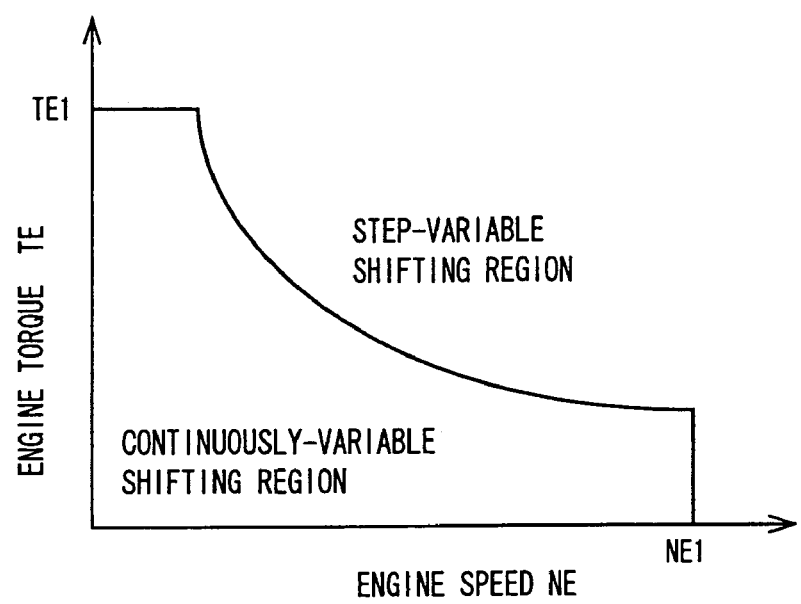
FIG. 8 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.

Referring to FIG. 8, there is shown a switching boundary line map (switching control map or relation) which is stored in the memory means 56 and which defines engine-output lines serving as boundary lines used by the switching control means 50 to determine whether the vehicle condition is in the step-variable or continuously-variable shifting region. These engine-output lines are defined by control parameters in the form of the engine speed $N_E$ and the engine torque $N_T$. The switching control means 50 may use the switching boundary line map of FIG. 8 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 8. In other words, the broken lines in FIG. 6 may be determined on the basis of the relation (map) of FIG. 8, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission.

In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can withstand the reaction torque when the engine output $T_E$ is not higher than the upper limit TE1, and the differential portion 11 is placed in the step-variable shifting state when the vehicle is in the high-output running state in which the engine torque $T_E$ is higher than the upper limit TE1. In the step-variable shifting state of the transmission portion 11, therefore, the first electric motor M1 need not withstand the reaction torque with respect to the engine torque $T_E$ as in the continuously-variable shifting state of the transmission portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the first electric motor M1 can be small-sized.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

Figure 9:
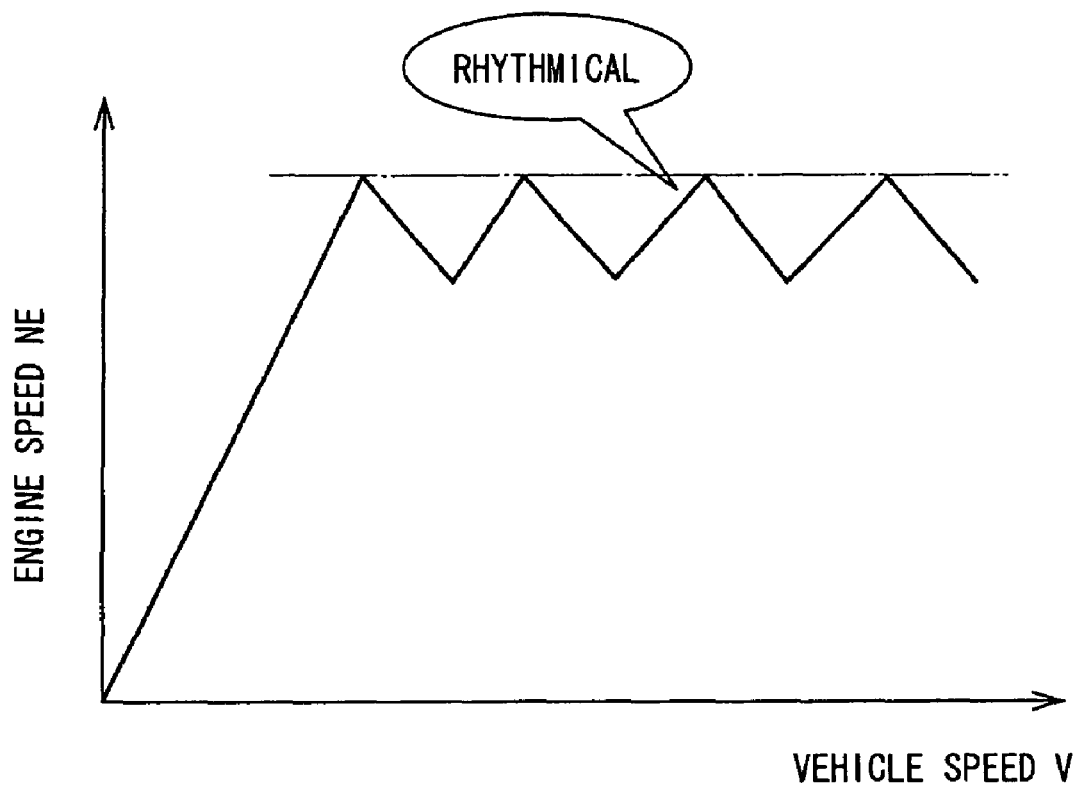
FIG. 9 is a view indicating an example of a variation of the engine speed as a result of a shift-up action of the step-variable transmission.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up, as indicated in FIG. 9.

Figure 10:
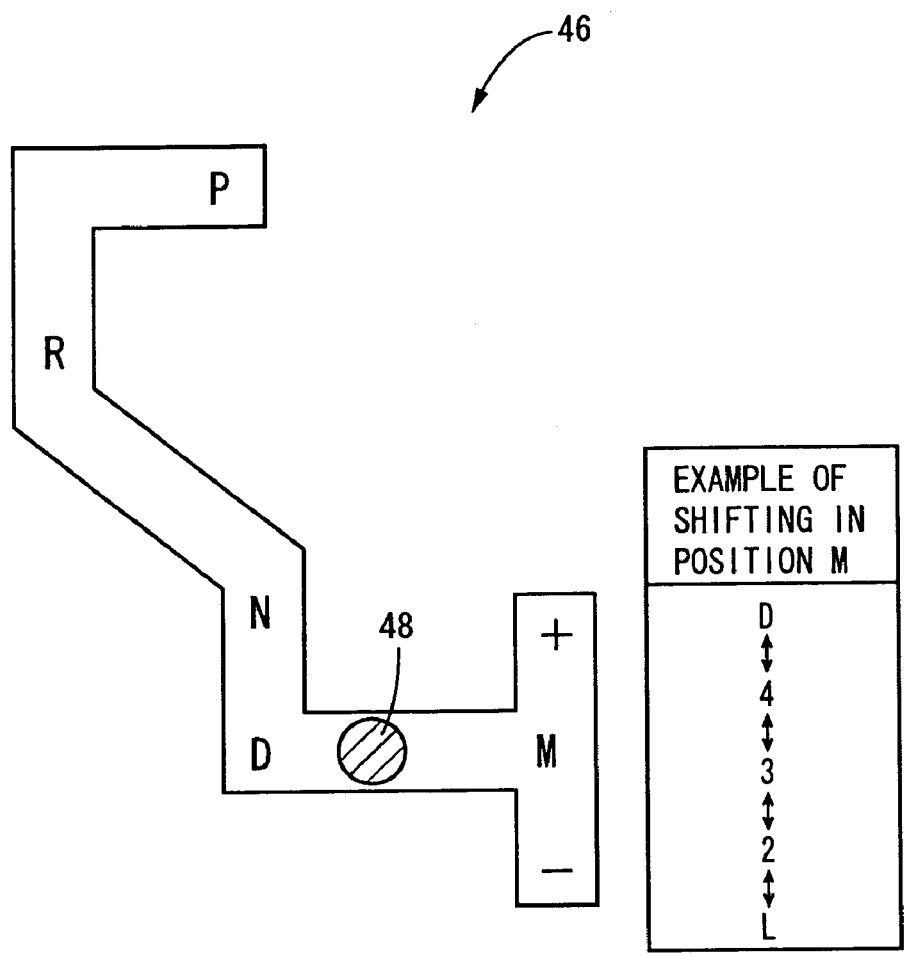
FIG. 10 is a view showing an example of a manually operated shifting device including a shift lever and operable to select one of a plurality of shift positions.

FIG. 10 shows an example of a manually operable shifting device in the form of a shifting device 46. The shifting device 90 includes the shift lever 48, which is disposed laterally adjacent to an operator's seat, for example, and which is manually operated to select one of a plurality of positions consisting of a parking position P for placing the drive system 10 (namely, automatic transmission portion 20) in a neutral state in which a power transmitting path is disconnected with both of the switching clutch C0 and brake B0 placed in the released state, and at the same time the output shaft 22 of the automatic transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 48 is operated to a selected one of the shift positions, a manual valve incorporated in the hydraulic control unit 42 and operatively connected to the shift lever 48 is operated to establish the corresponding state of the hydraulic control unit 42. In the automatic forward-drive position D or the manual forward-drive position M, one of the first through fifth gear positions ($1^{st}$ through $5^{th}$) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 92 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 48 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 48 is operated to the manual forward-drive position M, for manually selecting one of the above-indicated positions "D" through "L". Described in detail, the shift lever 48 is movable from the manual forward-drive position M to a shift-up position "+" and a shift-down position "−", which are spaced from each other in the longitudinal direction of the vehicle. Each time the shift lever 92 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 48 is biased by biasing means such as a spring so that the shift lever 48 is automatically returned from the shift-up position "+" and shift-down position "−" back to the manual forward-drive position M. The shifting device 46 is provided with a shift-position sensor (not shown) operable to detect the presently selected position of the shift lever 48, so that signals indicative of the presently selected operating position of the shift lever 48 and the number of shifting operations of the shift lever 48 in the manual forward-shifting position M.

When the shift lever 48 is operated to the automatic forward-drive position D, the switching control means 50 effects an automatic switching control of the transmission mechanism 10 according to the stored switching boundary line map indicated in FIG. 6, and the hybrid control means 52 effects the continuously-variable shifting control of the power distributing mechanism 16, while the step-variable shifting control means 54 effects an automatic shifting control of the automatic transmission portion 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission portion 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 48 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission portion 20 is automatically controlled to select an appropriate one of the gear positions the number of which is determined by the manually selected one of the shift positions, so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

As described above, the transmission mechanism 10 in the present embodiment is provided with the automatic transmission portion 20 in addition to the differential portion 11. The step-variable shifting control means 54 controls a shifting operation of the automatic transmission portion 20 on the basis of the vehicle condition and according to the shifting control map shown in FIG. 6 by way of example. A shifting action of the automatic transmission portion 20 is effected by a so-called "overlap control" of the engaging pressures of the releasing-side coupling device and the engaging-side coupling device on the basis of an amount of racing F of the input speed $N_{IN}$ of the automatic transmission portion 20 (hereinafter referred to as "racing amount"), such that the input speed $N_{IN}$ changes in a predetermined state for reducing the shifting shock of the automatic transmission portion 20.

The racing amount F indicated above corresponds to an amount of overlap between the engaging torque of the releasing-side coupling device and the engaging torque of the engaging-side coupling device. The racing amount F decreases with an increase of the amount of overlap, and increases with a decrease of the amount of overlap. The above-indicated predetermined state of change of the input speed $N_{IN}$ of the automatic transmission portion 20 is a state of change of the input speed $N_{IN}$, for example, a rate of change $N_{IN}'(=dN_{IN}/dt)$ of the input speed $N_{IN}$, which is obtained by experimentation such that the input speed $N_{IN}$ determined by the vehicle speed V and the speed ratio γ of the automatic transmission portion 20 changes in an ideal state, for example, such that the rate of change $N_{IN}'$ during the shifting action of the automatic transmission portion 20 provides a compromise between a value high enough to assure a high shifting response for rapid shifting as felt by the vehicle operator, and a value low enough to assure a low shifting response for easier reduction of the shifting shock, namely, a compromise between a need for reduction of the required shifting time and a need for reduction of the shifting shock.

Described in detail, the step-variable shifting control means 54, which has the function described above, includes racing-amount control means (a racing-amount control portion) 64 for changing the racing amount F of the input speed $N_{IN}$ of the automatic transmission portion 20 during its shifting action, to control the shifting action such that the input speed $N_{IN}$ changes in the predetermined state so as to reduce the shifting shock of the automatic transmission portion 20.

The racing-amount control means 64 of the step-variable shifting control means 54 arranged to generate hydraulic commands to be applied to the hydraulic control unit 42 is arranged to control the engaging pressures of the releasing-side and engaging-side coupling devices, and the timing of the releasing action of the releasing-side coupling device, and the timing of the engaging action of the engaging-side coupling device, so that the input speed $N_{IN}$ of the automatic transmission portion 20 during its shifting action changes in the predetermined state.

For instance, the racing-amount control means 64 implements an operation to make learning determination of the engaging pressures of the releasing-side and engaging-side coupling devices for the next occurrence of the same shifting action, on the basis of the racing amount F of the input speed $N_{IN}$ of the automatic transmission portion 20 at the moment of initiation of the inertia phase of the same shifting action on the present occurrence under the control of the step-variable shifting control means 54. The racing-amount control means 64 is further arranged to update a learning map of the engaging pressures of the coupling devices in question stored in relation to the engine torque $T_E$ and the vehicle speed V, by replacing the engaging pressures used for the present learning determination, with the engaging pressures determined by the present learning determination.

That is, the racing-amount control means 64 controls the amount of overlap of the engaging torques of the releasing-side and engaging-side coupling devices during each shifting action of the automatic transmission portion 20, by changing the engaging pressures and the timings of the releasing and engaging actions of those coupling devices on the basis of the racing amount F of the input speed $N_{IN}$ during the shifting action.

Where the racing amount F of the input speed $N_{IN}$ during a shifting action of the automatic transmission portion 20 is larger than a predetermined value, for instance, this indicates an insufficient amount of overlap of the engaging torques of the releasing-side and engaging-side coupling devices. In this case, the racing-amount control means 64 updates the learning map so as to increase the engaging pressure of the releasing-side coupling device and/or the engaging pressure of the engaging-side coupling device, for the next occurrence of the same shifting action, for increasing the amount of overlap of the engaging torques (toward a value of tie-up of the two coupling devices) to reduce the racing amount F toward the predetermined value.

Where the racing amount F of the input speed $N_{IN}$ during the shifting action of the automatic transmission portion 20 is smaller than the predetermined value, on the other hand, this indicates an excessive amount of overlap of the engaging torques of the releasing-side and engaging-side coupling devices, which causes a tie-up phenomenon of the two coupling devices. In this case, the racing-amount control means 64 updates the learning map so as to reduce the engaging pressure of the releasing-side coupling device and/or the engaging pressure of the engaging-side coupling device, for the next occurrence of the same shifting action, for reducing the amount of overlap of the engaging torques to increase the racing amount F toward the predetermined value.

The above-indicated predetermined value of the racing amount F is obtained by experimentation as a target value for reducing the shifting shock while improving the shifting response as felt by the vehicle operator.

The racing-amount control means 64 is further arranged to calculate a speed difference $\Delta N_{IN} (=N_{INR}-N_{INC})$ between an actual value $N_{INR}$ of the input speed $N_{IN}$ of the automatic transmission portion 20, and a calculated value $N_{INC}(=\gamma \times N_{OUT})$ which is obtained from the actual output speed $N_{OUT}$ of the automatic transmission portion 20 and the speed ratio γ of the automatic transmission portion 20. The racing-amount control means 64 determines a maximum value $\Delta N_{INMAX}$ of the speed difference $\Delta N_{IN}$, as the racing amount F of the input speed $N_{IN}$. The racing-amount control means 64, which obtains the speed difference $\Delta N_{IN}$ from time to time, determines the value $\Delta N_{IN}(n)$ as the maximum value $\Delta N_{INMAX}$ when $\Delta N_{IN}(n-1) < \Delta N_{IN}(n)$, while $\Delta N_{IN}(n) > \Delta N_{IN}(n+1)$.

As described above, the racing-amount control means 64 controls the amount of racing of the input speed $N_{IN}$ of the automatic transmission portion 20 at the moment of initiation of the inertia phase of the shifting action, for the learning control of the engaging pressure of the releasing-side coupling device and/or the engaging pressure of the engaging-side coupling device, so as to reduce the shifting shock and improve the shifting response as felt by the vehicle operator, during the shifting action of the automatic transmission portion 20. Namely, the racing-amount control means 64 of the step-variable shifting control means 54 controls the engaging pressure(s) of the releasing-side coupling device and/or the engaging-side coupling device, according to the learning map, such that the racing amount F of the input speed $N_{IN}$ of the automatic transmission portion 20 during its clutch-to-clutch shifting action is controlled to the predetermined value.

Where the engaging pressure of the releasing-side coupling device and/or the engaging pressure of the engaging-side coupling device is/are controlled according to the learning map, a variation of the engine torque $T_E$ during the shifting action of the automatic transmission portion 20 may cause deterioration of a transfer of a torque between the two coupling devices, giving rise to a risk of generation of a large shifting shock.

For example, the deterioration of the torque transfer due to the variation of the engine torque $T_E$ during the shifting action of the automatic transmission portion 20 may cause the so-called "tie-up" phenomenon without a racing of the input speed $N_{IN}$, in which the rotating speed of a rotary element of the automatic transmission portion 20 is temporarily reduced. The tie-up phenomenon causes a temporary reduction of the output torque $T_{OUT}$, giving rise to the risk of generation of large shifting shock.

The variation of the engine torque $T_E$ may be a periodic vibration (pulsation) always taking place due to periodic ignition (combustion) of cylinders of the engine 8, for example. Where the air/fuel ratio A/F (intake air quantity/amount of fuel injection) of the engine 8 is controllable, the engine torque $T_E$ varies when the air/fuel ratio A/F is switched between a lean-burn value higher than the stoichiometric value and a rich-burn value lower than the stoichiometric value, depending upon the load (low, medium or high load) of the vehicle, or temporarily increases due to the rich-spike operation to temporarily increase the air/fuel ratio A/F to the rich-burn value during a lean-burn operation of the engine 8. Where the engine 8 is of a variable-cylinder type in which the number of the operating cylinders is variable by cutting off the fuel supply to the selected cylinder or cylinders depending upon the engine load, the engine torque $T_E$ varies when the engine 8 is switched between a partial-cylinder operation (reduced-cylinder or zero-cylinder operation) and an all-cylinder operation, depending upon the load (low, medium or high load) of the vehicle. In the partially-cylinder operation, the fuel supply to the selected one or ones or all of the cylinders is cut off. In the all-cylinder operation, all of the cylinders are operated.

The variation (pulsation) of engine torque $T_E$ described above may be absorbed to some extent, by a torque converter, a fluid coupling or any other fluid-operated power transmitting device provided in a common power transmitting system wherein the fluid-operated power transmitting device is disposed in a power transmitting path between a step-variable automatic transmission and an engine. In other words, the temporary increase (variation) of the engine torque $T_E$ is not transmitted directly to the step-variable automatic transmission. In this case, the fluid-operated power transmitting device is considered to reduce the shifting shock of the step-variable automatic transmission due to an influence of the variation of the engine torque $T_E$ during the shifting action.

However, the transmission mechanism 10 in the present embodiment is not provided with such a fluid-operated power transmitting device disposed in the power transmitting path between the engine 8 and the automatic transmission portion 20. Namely, the transmission mechanism 10 is a power transmitting system wherein the engine 8 is directly connected to the automatic transmission portion 20 through a power transmitting path provided with the input clutch, so that the variation of the engine torque $T_E$ may be transmitted directly to the automatic transmission portion 20, and may cause generation of a large shifting shock of the automatic transmission due to the influence of the variation of the engine torque $T_E$ during the shifting action.

To reduce the shifting shock of the automatic transmission 20 due to the variation of the engine torque $T_E$ during the shifting action, the torque capacity of the input clutch is reduced during the shifting action of the automatic transmission 20, to limit the torque to be transmitted to the automatic transmission portion 20, to a value not larger than a predetermined value, so that even if the engine torque $T_E$ exceeds a maximum torque that can be transmitted through the input clutch, a difference of the engine torque $T_E$ with respect to the maximum torque is not transmitted to the automatic transmission portion 20. In other words, the torque capacity of the input clutch is reduced to enable the input clutch to operate as a torque limiting device during the shifting action of the automatic transmission portion 20, so that the torque to be transmitted to the automatic transmission portion 20 is limited to the value not larger than the predetermined value.

Described in detail, shifting-initiation determining means (shifting-initiation determining portion) 80 is provided to determine whether a shifting action of the automatic transmission portion 20 under the control of the step-variable shifting control means 54 is initiated or not. For example, this determination is made by determining whether the step-variable shifting control means 54 has applied a command to the hydraulic control unit 42 to release the releasing-side coupling device and at the same time engage the engaging-side coupling device, for shifting the automatic transmission portion 20 to one of the gear positions, which is determined on the basis of the vehicle condition and according to the shifting control map shown in FIG. 6.

Input-clutch control means (input-clutch control portion) 82 is operated when the shifting-initiation determining means 80 has determined that the shifting action of the automatic transmission portion 20 is initiated. The input-clutch control means 82 is arranged to temporarily reduce the torque capacity of the above-described input clutch during the shifting action of the automatic transmission 20, for limiting the torque to be transmitted to the automatic transmission portion 20, to the value not larger than the predetermined value. This predetermined value is obtained by experimentation as an upper limit of the torque to be transmitted to the automatic transmission portion 20, to prevent an input of the engine torque $T_E$ exceeding this upper limit from to the automatic transmission portion 20. Namely, the input-clutch control means 82 is operated, upon determination by the shifting-initiation determining means 80 that the shifting action of the automatic transmission portion 20 is initiated, to control a temporarily slipping action of the input clutch during the shifting action of the automatic transmission portion 20. In other words, the input-clutch control means 82 enables the input clutch to temporarily operate as the torque limiting device during the shifting action of the automatic transmission portion 20, if the shifting-initiation determining means 80 has determined that the shifting action is initiated.

For instance, the input-clutch control means 82 supplies the hydraulic control unit 42 with a command for temporarily reducing the engaging pressure of the input clutch which has been engaged immediately after the initiation of the shifting action of the automatic transmission portion 20, in other words, a command for temporarily reducing the ratio of engagement of the input clutch or temporarily increasing a slip ratio ΔN of the input clutch, for a predetermined length of time obtained by experimentation to reduce the influence of the variation of the engine torque $T_E$.

The input clutch is a coupling device which is different from the releasing-side and engaging-side coupling devices the engaging pressures of which are subject to the learning control during the shifting action of the automatic transmission portion 20, but is a coupling device used to reduce the shifting shock of the automatic transmission portion 20. In this respect, the input clutch is not used to effect the shifting action of the automatic transmission portion 20.

As described above, the first clutch C1 and the second clutch C2 serve as the input clutch in the present embodiment. The first clutch C1 is engaged for establishing any one of the first through fourth gear positions while the second clutch C2 is also engaged for shifting actions between the third and fourth gear positions. In this respect, the first clutch C1 is the input clutch the torque capacity of which is temporarily reduced during the shifting action of the automatic transmission portion 20 under the control of the input-clutch control means 82.

The input-clutch control means 82 is not arranged to merely limit the torque that can be transmitted through the input clutch (first clutch C1), to a predetermined value, but is arranged to control the amount of reduction of the torque capacity of the input clutch according to a variation of the engine torque $T_E$, so as to more effectively reduce the shifting shock during the shifting action of the automatic transmission portion 20.

For example, the input-clutch control means 82 is arranged to increase the amount of reduction of the torque capacity of the input clutch (first clutch C1) with an increase of the amount of variation of the engine torque $T_E$. In other words, the input-clutch control means 82 is arranged to increase the slip ratio ΔN of the input clutch with an increase of the amount of variation of the engine torque $T_E$. The amount of variation of the engine torque $T_E$ is considered to increase with an increase of the engine torque $T_E$. In this respect, the input-clutch control means 82 determines the slip ratio ΔN of the input clutch on the basis of the actual engine torque $T_E$ and according to a predetermined relationship between the engine torque $T_E$ and the slip ratio ΔN, which relationship is obtained by experimentation such that the slip ratio ΔN increases with an increase of the engine torque $T_E$. For example, the actual engine torque $T_E$ may be obtained by calculating an estimated engine torque value on the basis of the actual values of the throttle valve opening angle $\theta_{TH}$ and the engine speed $N_E$ and according to a predetermined relationship among the estimated engine torque value, the throttle valve opening angle $\theta_{TH}$ and the engine speed $N_E$. Alternatively, the actual engine torque $T_E$ may be detected by a torque sensor.

It is considered that the shifting shock due to the influence of the variation of the engine torque $T_E$ increases with a decrease of the engine speed $N_E$ during the shifting action. In this respect, the input-clutch control means 82 may be arranged to determine the slip ratio ΔN of the input clutch such that the amount of reduction of the torque capacity of the input clutch increases with a decrease of the engine speed $N_E$. For example, the input-clutch control means 82 is arranged to determine the slip ratio ΔN on the basis of the actual engine speed $N_E$ and according to a predetermined relationship between the slip ratio ΔN and the engine speed $N_E$, which relationship is obtained by experimentation such that the slip ratio ΔN increases with a decrease of the engine speed $N_E$.

Where the engine 8 is of the variable-cylinder type as descried above, the periodic variation (pulsation) of the engine torque $T_E$ changes according to the number of the operating cylinders, so that the shifting shock due to the variation of the engine torque $T_E$ is considered to increase with a decrease of the number of the operating cylinders. In this respect, the input-clutch control means 82 may be arranged to determine the slip ratio ΔN of the input clutch (first clutch C1) such that the amount of reduction of the torque capacity of the input clutch increases with a decrease of the number of the operating cylinders. For example, the input-clutch control means 82 is arranged to determine the slip ratio ΔN on the basis of the number of the operating cylinders and according to a predetermined relationship between the slip ratio ΔN and the number of the operating cylinders, which relationship is obtained by experimentation such that the slip ratio ΔN increases with a decrease of the number of the operating cylinders.

Where the air/fuel ratio A/F of the engine 8 is variable as described above, the shifting shock is considered to be large when the engine torque $T_E$ is temporarily increased due to switching of the engine 8 from the lean-burn state to the rich-burn state or the rich spike operation, which takes place during the shifting action. In this respect, the input-clutch control means 82 may be arranged to control the amount of reduction of the torque capacity of the input clutch (first clutch C1), that is, the slip ratio ΔN of the input clutch, to a predetermined value obtained by experimentation so as to reduce the shifting shock upon switching of the engine 8 from the lean-burn state to the rich-burn state or upon the rich spike operation, which takes place during the shifting operation.

It is noted that the transmission mechanism 10 (differential portion 11 or power distributing mechanism 16) in the present embodiment is selectively switchable between the continuously-variable shifting state (differential state) and the non-continuously-variable shifting state (locked state). On the basis of the vehicle condition, the switching control means 50 determines the shifting state in which the differential portion 11 should be placed, and switch the differential portion 11 to the determined continuously-variable shifting state or step-variable shifting state.

While the differential portion 11 is placed in the step-variable shifting state, for example, the engine torque $T_E$ is transmitted to the power transmitting member 18 primarily through the mechanical power transmitting path, so that it is impossible to reduce a variation of the torque transmitted to the automatic transmission portion 20, which takes place due to a variation of the engine torque $T_E$.

While the differential portion 11 is placed in the continuously-variable shifting state, on the other hand, it is possible to reduce the variation of the torque transmitted to the automatic transmission portion 20, irrespective of the variation of the engine torque $T_E$.

While the differential portion 11 is placed in the continuously-variable shifting state, the hybrid control means 52 may be arranged, for example, to change the first electric motor speed $N_{M1}$ in synchronization with the engine torque variation, by the electric CVT function (differential function) of the differential portion 11, for the purpose of reducing the engine torque variation due to the ignition of the engine cylinders, which is transmitted to the power transmitting member 18, that is, for the purpose of reducing the variation of the torque transmitted to the power transmitting member 18, irrespective of the periodic engine torque variation. Namely, the first electric motor M1 is controlled so as not to generate a reaction torque corresponding to a variation of the torque transmitted to the power transmitting member 18 due to the periodic engine torque variation, so that the periodic engine torque variation is not transmitted to the downstream portion of the power transmitting path. The first electric motor speed $N_{M1}$ is changed to prevent the generation of the reaction torque by the first electric motor M1, which corresponds to the torque variation. Described from another point of view, the first electric motor speed $N_{M1}$ varies in synchronization with the periodic engine torque variation, as a result of an operation to control the first electric motor M1 so as not to generate the reaction torque corresponding to the torque variation.

Alternatively, the hybrid control means 52 may be arranged to control the engine torque $T_E$ which is distributed to the first electric motor M1 and which is transmitted as an electric energy to the second electric motor M2, that is, to control the torque to be transmitted through the electric path, for the purpose of reducing the variation of the engine torque TE transmitted to the power transmitting member 18, that is, for the purpose of reducing the torque transmitted to the power transmitting member 8, irrespective of the engine torque variation. The torque to be transmitted through the electric path is the engine torque $T_E$ that is distributed to the first electric motor M1 and converted into an electric energy which is supplied directly to the second electric motor M2 through the inverter 58, or which is once stored in the electric-energy storage device and then supplied from the electric-energy storage device indirectly to the second electric motor M2 through the inverter 58.

Namely, the engine torque $T_E$ is divided by the differential portion 11 into a torque mechanically transmitted to the power transmitting member 18, that is, a mechanical path torque, and a torque transmitted to the power transmitting member 18 through the electric path, that is, an electric path torque. Like the engine torque $T_E$, the variation of the engine torque TE is divided into a component corresponding to the mechanical path torque and a component corresponding to the electric path torque, which components are transmitted to the power transmitting member 18. The variation of the engine torque $T_E$ transmitted to the power transmitting member 18 is reduced by reducing the electric path torque component of the variation of the engine torque $T_E$.

The hybrid control means 52 may also be arranged to limit the electric path torque, by storing an electric energy in the electric-energy storage device 60, so as to reduce, for example, so as to smooth the electric path torque component of the variation of the engine torque $T_E$. In other words, the hybrid control means 52 may be arranged to store in the electric-energy storage device 60 a portion of the electric path torque which exceeds a preset upper limit and which is not transmitted to the second electric motor M2, so that the electric path torque component of the variation of the engine torque $T_E$ is reduced.

The hybrid control means 52 may also be arranged to limit the electric path torque, by storing an electric energy in the electric-energy storage device 60, so as to reduce the electric path torque component of the variation (increase) of the engine torque $T_E$, when the engine torque varies (increases) temporarily upon the rich spike operation. Described from another point of view, the hybrid control means 52 increases the electricity generating load of the first electric motor M1 during the rich spike operation, for thereby reducing the amount of change of the first electric motor speed $N_{M1}$, and stores the electric energy generated by the first electric motor M1 in the electric-energy storage device 60, for reducing the amount of change of the rotating speed of the power transmitting member 18 during the rich spike operation.

The hybrid control means 52 may also be arranged to control the electric path torque so as to offset the mechanical path torque component of the variation of the engine torque $T_E$, as well as to reduce the electric path torque component of the variation of the engine torque $T_E$, for further reducing the variation of the engine torque $T_E$ transmitted to the power transmitting member 18.

For example, when the engine torque $T_E$ temporarily varies (increases) upon the rich spike operation, the hybrid control means 52 may be arranged to store an electric energy in the electric-energy storage device 60, so as to offset the mechanical path torque component of the variation (increase) of the engine toque $T_E$, as well as to limit the electric path torque so as to reduce the electric path torque component of the variation (increase) of the engine torque $T_E$, so that the variation (increase) of the engine torque $T_E$ transmitted to the power transmitting member 18 can be further reduced.

As described above, the variation of the engine torque $T_E$ transmitted to the power transmitting member 18 can be reduced by the hybrid control means 52 while the differential portion 11 is placed in the continuously-variable shifting state, but cannot be reduced while the differential portion 11 is placed in the step-variable shifting state.

In view of the above, the input-clutch control means 82 changes the amount of reduction of the torque capacity of the input clutch (first clutch C1), depending upon whether the differential function of the differential potion 11 is limited or not, that is, whether the operation of the differential portion 11 as the electrically controlled continuously variable transmission is limited or not, in other words, depending upon whether the differential portion 11 is placed in the step-variable shifting state or not. For instance, the input-clutch control means 82 is arranged to change the amount of reduction of the torque capacity of the input clutch, such that the amount of reduction of the torque capacity of the input clutch corresponds to the continuously-variable or step-variable shifting state in which the differential portion 11 is placed, in other words, so that the shifting shock due to the variation of the engine torque $T_E$ during the shifting action of the automatic transmission portion 20 is almost the same irrespective of whether the differential portion 11 is placed in the continuously-variable shifting state or the step-variable shifting state.

Described in detail, locked-stated determining means (locked-state determining portion) 84 is provided to determine whether the power distributing mechanism 16 is placed in the non-differential state (locked state) or not, that is, whether the differential portion 11 is placed in the non-continuously-variable shifting state (step-variable shifting state) or not, when the above-described shifting-initiation determining means 80 has determined that a shifting action of the automatic transmission portion 20 is initiated. For instance, the locked-state determining means 84 is arranged to determine whether the differential portion 11 is placed in the step-variable shifting state, by determining whether the vehicle condition represented by the vehicle speed V and the output torque $T_{OUT}$ is in the step-variable shifting region defined by the switching control map shown in FIG. 6 by way of example, which is used by the switching control means 50 to determine that the transmission mechanism 10 should be switched to the step-variable shifting state when the vehicle condition is in the step-variable shifting region, and switched to the continuously-variable shifting state when the vehicle condition is in the continuously-variable shifting region.

When the shifting-initiation determining means 80 determines that a shifting action of the automatic transmission portion 20 is initiated, and when the locked-state determining means 84 determines that the differential portion 11 is placed in the step-variable shifting state, the input-clutch control means 82 determines the amount of reduction of the torque capacity of the input clutch (first clutch C1) to be larger than when the differential portion 11 is placed in the continuously-variable shifting state, since the variation of the engine torque $T_E$ transmitted to the power transmitting member 18 cannot be reduced by the hybrid control means 52 when the differential portion 11 is placed in the step-variable shifting state. For instance, the input-clutch control means 82 sets the slip ratio ΔN to a value $ΔN_Y$ for the step-variable shifting state of the differential portion 11.

When the shifting-initiation determining means 80 determines that a shifting action of the automatic transmission portion 20 is initiated, and when the locked-state determining means 84 determines that the differential portion 11 is placed in the continuously-variable shifting state, the input-clutch control means 82 determines the amount of reduction of the torque capacity of the input clutch (first clutch C1) to be smaller than when the differential portion 11 is placed in the step-variable shifting state, since the variation of the engine torque $T_E$ transmitted to the power transmitting member 18 can be reduced by the hybrid control means 52 when the differential portion 11 is placed in the step-variable shifting state. For instance, the input-clutch control means 82 sets the slip ratio ΔN to a value $ΔN_M$ for the continuously-variable shifting state of the differential portion 11, which value $ΔN_M$ is smaller than the value $ΔN_Y$ for the step-variable shifting state.

During a shifting action of the automatic transmission portion 20 under the control of the step-variable shifting control means 54 while the differential portion 11 is placed in the continuously-variable shifting state, the hybrid control means 52 controls the speed ratio of the differential portion to continuously change the overall speed ratio γT while holding the engine speed $N_E$ substantially constant, for example, for reducing the shifting shock and improving the fuel economy. Even where the target value of the overall speed ratio γT changes by a large amount during the shifting action of the automatic transmission portion 20, the hybrid control means 52 once controls the speed ratio of the differential portion 11 while holding the engine speed $N_E$ substantially constant during the shifting action, so that the overall speed ratio γT is continuously changed. Then, the hybrid control means 54 further controls the speed ratio of the differential portion 11 such that the overall speed ratio γT continuously changes toward the target value.

In this instance, however, the vehicle operator may desire to change the overall speed ratio γT in steps (non-continuously) rather than continuously, for improving the shifting response.

Where the automatic transmission portion 20 is shifted as indicated by arrow "a" or "b" of solid line B in FIG. 6 by way of example, as a result of a change of the vehicle speed V, the amount of change of the overall speed ratio γT during the shifting action of the automatic transmission portion 20 is small or almost zero, so that it is desirable to reduce the shifting shock and improve the fuel economy, than to improve the shifting response. Where the automatic transmission portion 20 is shifted as indicated by arrow "c" and "d" of solid line C in FIG. 6, as a result of a change of the required output torque $T_{OUT}$ due to a depressing or releasing operation of the accelerator pedal, on the other hand, the amount of change of the overall speed ratio γT during the shifting action of the automatic transmission portion 20 is larger than in the case of the solid line B, so that it may be desirable to improve the shifting response by changing the overall speed ratio γT in steps (non-continuously) during the shifting action of the automatic transmission portion 20, than to reduce the shifting shock and improve the fuel economy by changing the overall speed ratio γT continuously.

Thus, it is desirable to continuously change the overall speed ratio γT during the shifting action of the automatic transmission portion 20, for reducing the shifting shock and improving the fuel economy, where the amount of change of the overall speed ratio γT during the shifting action of the automatic transmission portion 20 is small or almost zero, and it is desirable not to continuously change the overall speed ratio γT, that is, to change the overall speed ratio γT in steps during the shifting action of the automatic transmission portion 20, for improving the shifting response, where the amount of change of the overall speed ratio γT during the shifting action of the automatic transmission portion 20 is large. Described from another point of view, where the amount of change of the overall speed ratio γT during the shifting action of the automatic transmission portion 20 is large as a result of a depressing or releasing operation of the accelerator pedal, for example, the vehicle operator may desire a change of the overall speed ratio γT in steps, so-called "a stepping change" of the overall speed ratio γT. In this case, therefore, the overall speed ratio γT is changed in steps, by utilizing a change of the speed ratio γ of the automatic transmission portion 20 in steps.

In view of the above, the present embodiment is arranged to control the speed ratio of the differential portion 11 so as to change the overall speed ratio γT in steps during the shifting action of the automatic transmission portion 20, where the amount of change of the overall speed ratio γT during the shifting action is large.

Described in detail, the speed-ratio-change determining means (speed-ratio-change determining portion) 86 is provided to determine the amount of change of the overall speed ratio γT, when the shifting-initiation determining means 80 determines that a shifting action of the automatic transmission portion 20 is initiated, and when the locked-state determining means 84 determines that the differential portion 11 is placed in the continuously-variable shifting state.

For instance, the speed-ratio-change determining means 86 is arranged to determine whether the shifting action of the automatic transmission portion 20 causes a non-continuous change, that is, a stepping change of the overall speed ratio γT or not, when the locked-state determining means 84 determines that the differential portion 11 is placed in the continuously-variable shifting state at the moment of initiation of the shifting action of the automatic transmission portion 20 under the control of the step-variable shifting control means 54. The above-described determination by the speed-ratio-change determining means 86 is made by determining whether the amount of change of the overall speed ratio γT is large, for example, by determining whether the amount of change of the target value of the overall speed ratio γT is larger than a predetermined threshold, as in the case of a shifting action indicated by arrow "c" or "d" of solid line C indicated in FIG. 6 b way of example, as a result of a depressing or releasing operation of the accelerator pedal. The predetermined threshold is obtained by experimentation as a value above which it is considered that the vehicle operator desires a stepping (namely, non-continuous) change of the overall speed ratio γT rather than a continuous change of the same.

The hybrid control means 52, which has the above-described function, is also arranged to control the speed ratio of the differential portion 11 so as to change the overall speed ratio γT toward the target value, without synchronization with and independently of the shifting action of the automatic transmission portion 20, rather than to change the overall speed ratio γT continuously by changing the speed ratio γ0 of the differential portion 11 in synchronization with the shifting action of the automatic transmission portion 20 and according to a change of the speed ratio γ of the automatic transmission portion 20, when the locked-state determining means 84 determines that the differential portion 11 is placed in the continuously-variable shifting state at the moment of initiation of the shifting action of the automatic transmission portion 20 under the control of the step-variable shifting control means 54, and when the speed-ratio-change determining means 86 determines that the shifting action causes a stepping change of the overall speed ratio γT. This arrangement makes it possible to change the overalls peed ratio γT toward the target value, by adding (or subtracting) the change of the speed ratio of the differential portion 11 to (or from) the stepping change of the speed ratio of the automatic transmission portion 20, so that the overall speed ratio γT is changed in steps during the shifting action of the automatic transmission portion 20, whereby the shifting response is improved.

Thus, the hybrid control means 52 controls the speed ratio of the differential portion 11 during the shifting action such that the overall speed ratio γT is continuously changed while the engine speed $N_E$ is held substantially constant, when the speed-ratio-change determining mean 86 determines that the shifting action does not cause a stepping change of the overall speed ratio γT, and controls the speed ratio of the differential portion 11 independently of the shifting action of the automatic transmission portion 20 such that the overall speed ratio γT is changed in steps, when the speed-ratio-change determining means 86 determines that the shifting action causes the stepping change of the overall speed ratio γT.

Accordingly, during the shifting action of the automatic transmission portion 20 in the continuously-variable shifting state of the differential portion 11, the amounts of change of the engine speed $N_E$ and the rotating speeds of the rotary members of the differential portion 11 when the overall speed ratio γT is changed continuously with a restricted amount of change of the engine speed $N_E$ are different from those when the overall speed ratio γT is changed in steps with a change of the engine speed $N_E$. In other words, the stepping change of the overall speed ratio γT with a large amount of change of the engine speed $N_E$ during the shifting action has a possibility of generation of a larger inertia torque than the continuously change of the overall speed ratio γT with a small amount of change of the engine speed $N_E$.

In view of the above, the input-clutch control means 82, which is operated when the differential portion 11 is placed in the continuously-variable shifting state at the moment of initiation of a shifting action of the automatic transmission portion 20 under the control of the step-variable shifting control means 54, changes the amount of reduction of the torque capacity of the input clutch (first clutch C1) depending upon whether the shifting action of the automatic transmission portion 20 causes the stepping change or the continuously change of the overall speed ratio γT. For example, the input-clutch control means 82 changes the amount of reduction of the torque capacity of the input clutch in the continuously-variable shifting state of the differential portion 11, according to the stepping or continuous change of the overall speed ratio γT during the shifting action of the automatic transmission portion 20, such that the shifting shock due to a variation of the engine torque $T_E$ during the shifting action of the automatic transmission portion 20 is almost the same, irrespective of whether the shifting action causes the stepping change with a large amount of change of the engine speed $N_E$ or the continuous change with a small amount of change of the engine speed $N_E$, although the stepping and continuous changes cause generation of different values of the inertia torque.

When the speed-ratio-change determining means 86 determines that the shifting action of the automatic transmission portion 20 causes the stepping change of the overall speed ratio γT, for example, while the shifting-initiation determining means 80 determines that the shifting action is initiated and while the locked-state determining means 84 determines that the differential portion 11 is placed in the continuously-variable shifting state, the input-clutch control means 82 determines the amount of reduction of the torque capacity of the input clutch (first clutch C1) to be comparatively large, since the stepping change of the overall speed ratio γT causes generation of a large value of the inertia torque than the continuous change. In this case, the input-clutch control means 82 sets the slip ratio ΔN to a value $ΔN_{M2}$ which is smaller than the slip ratio value $ΔN_Y$ for the step-variable shifting state of the differential portion and which is larger than the slip ratio value $ΔN_M$ for the continuously-variable shifting state of the differential portion 11.

When the speed-ratio-change determining means 86 determines that the shifting action of the automatic transmission portion 20 does not cause the stepping change of the overall speed ratio γT, for example, while the shifting-initiation determining means 80 determines that the shifting action is initiated and while the locked-state determining means 84 determines that the differential portion 11 is placed in the continuously-variable shifting state, the input-clutch control means 82 determines the amount of reduction of the torque capacity of the input clutch (first clutch C1) to be smaller than when the shifting action causes the stepping change. In this case, the input-clutch control means 82 sets the slip ratio ΔN to the value $ΔN_M$ for the continuously-variable shifting state of the differential portion 11.

Figure 11:
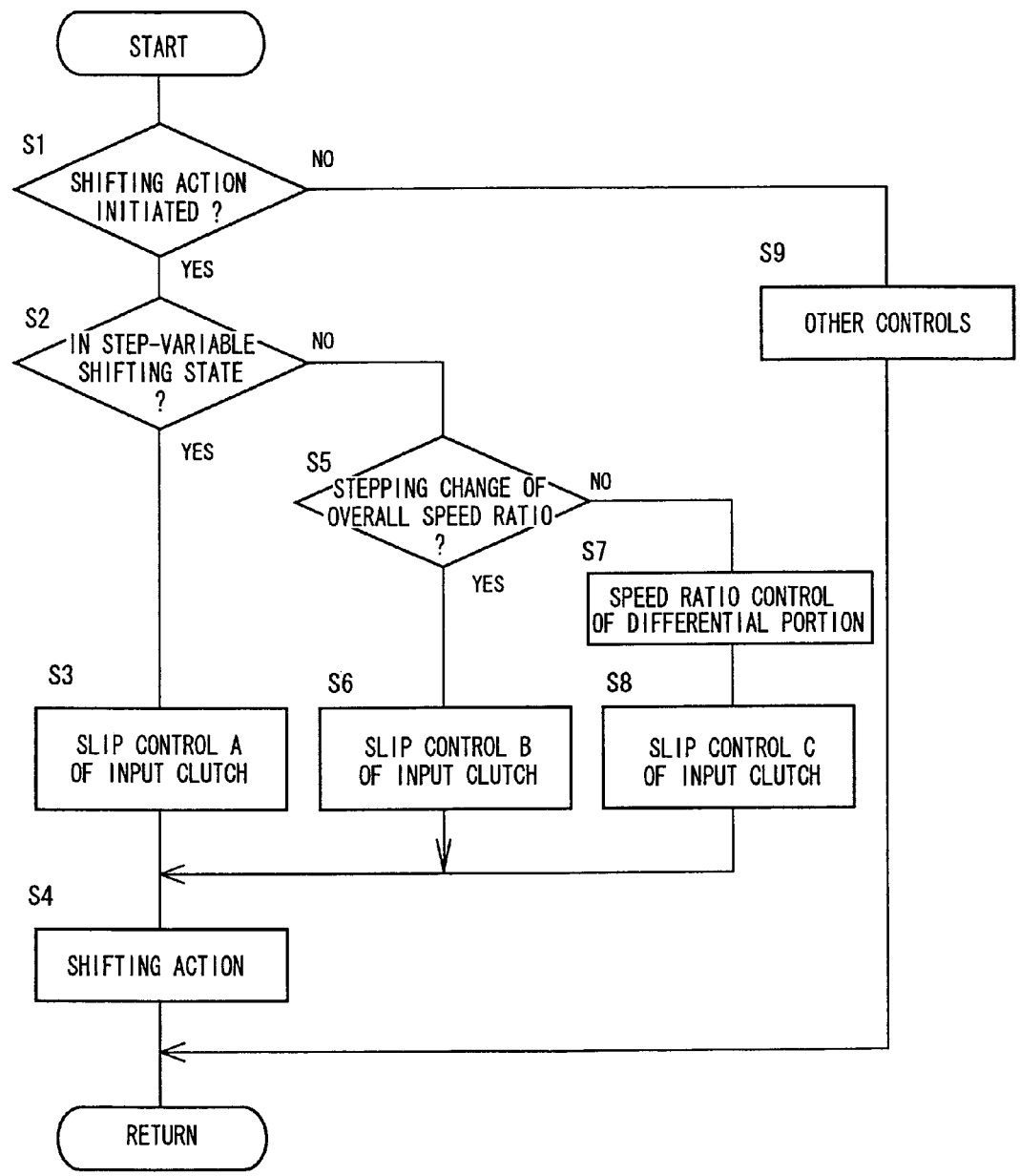
FIG. 11 is a flow chart illustrating a control operation of the electronic control device of FIG. 5, that is, a control routine for reducing an engine torque variation to be transmitted to an automatic transmission portion during a shifting action of the automatic transmission portion.

Referring to the flow chart of FIG. 11, there is illustrated a major control operation of the electronic control device, that is, a control routine for reducing the variation of the engine torque $T_E$ to be transmitted to the automatic transmission portion 20 during a shifting action of the automatic transmission portion 20. This control routine is repeated executed with an extremely short cycle time of about several milliseconds to about several tens of milliseconds.

Figure 12:
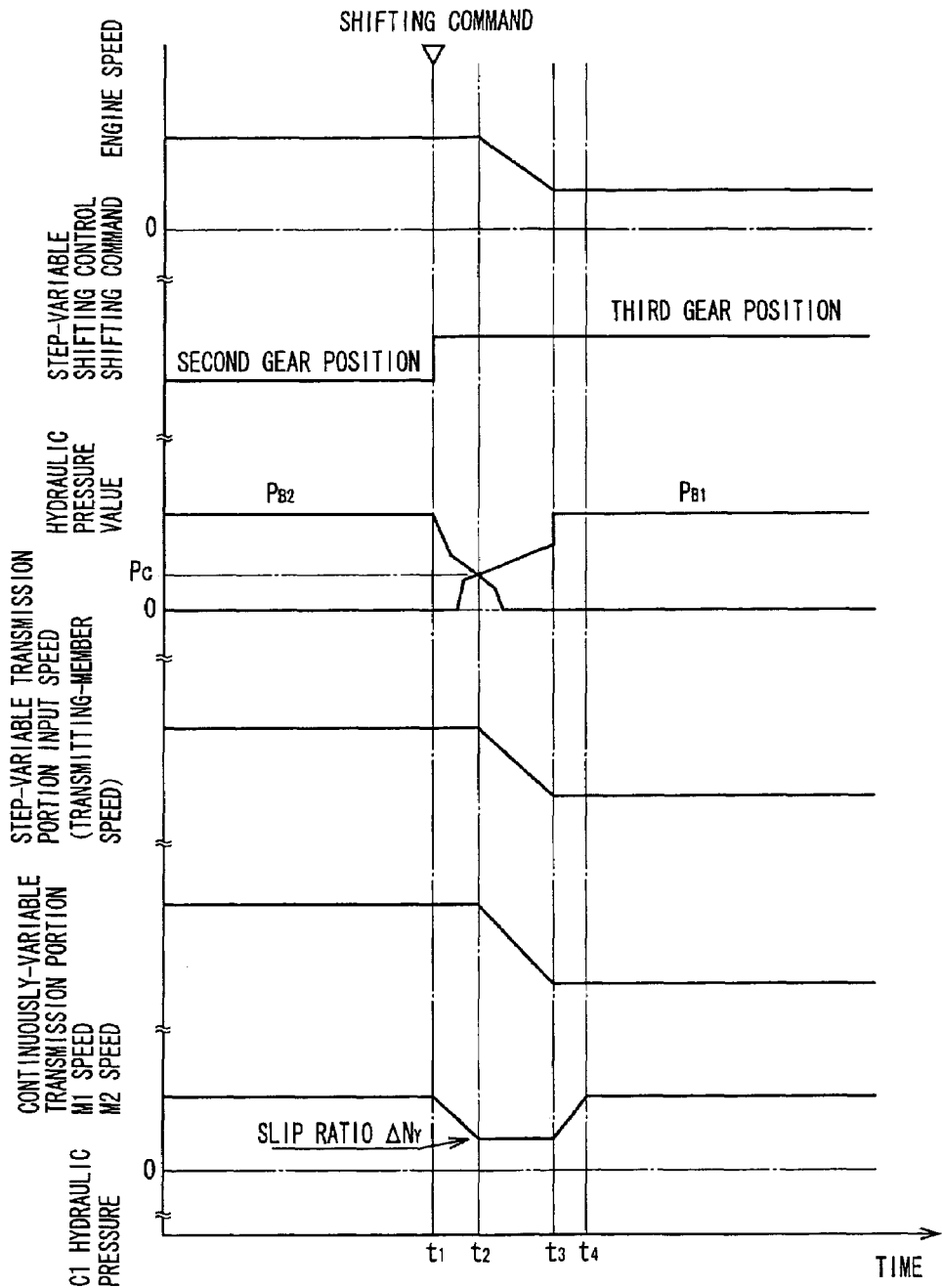
FIG. 12 is a time chart for explaining the control operation illustrated in the flow chart of FIG. 11, when the automatic transmission portion is commanded to effect a shift-up action from a second gear position to a third gear position while the differential portion is placed in the step-variable shifting state (locked state).

The time chart of FIG. 12 explains the control operation illustrated in the flow chart of FIG. 11, when the automatic transmission portion 20 is commanded to effect a shift-up action from the second gear position to the third gear position while the differential portion 11 is placed in the step-variable shifting state (locked state).

Figure 13:
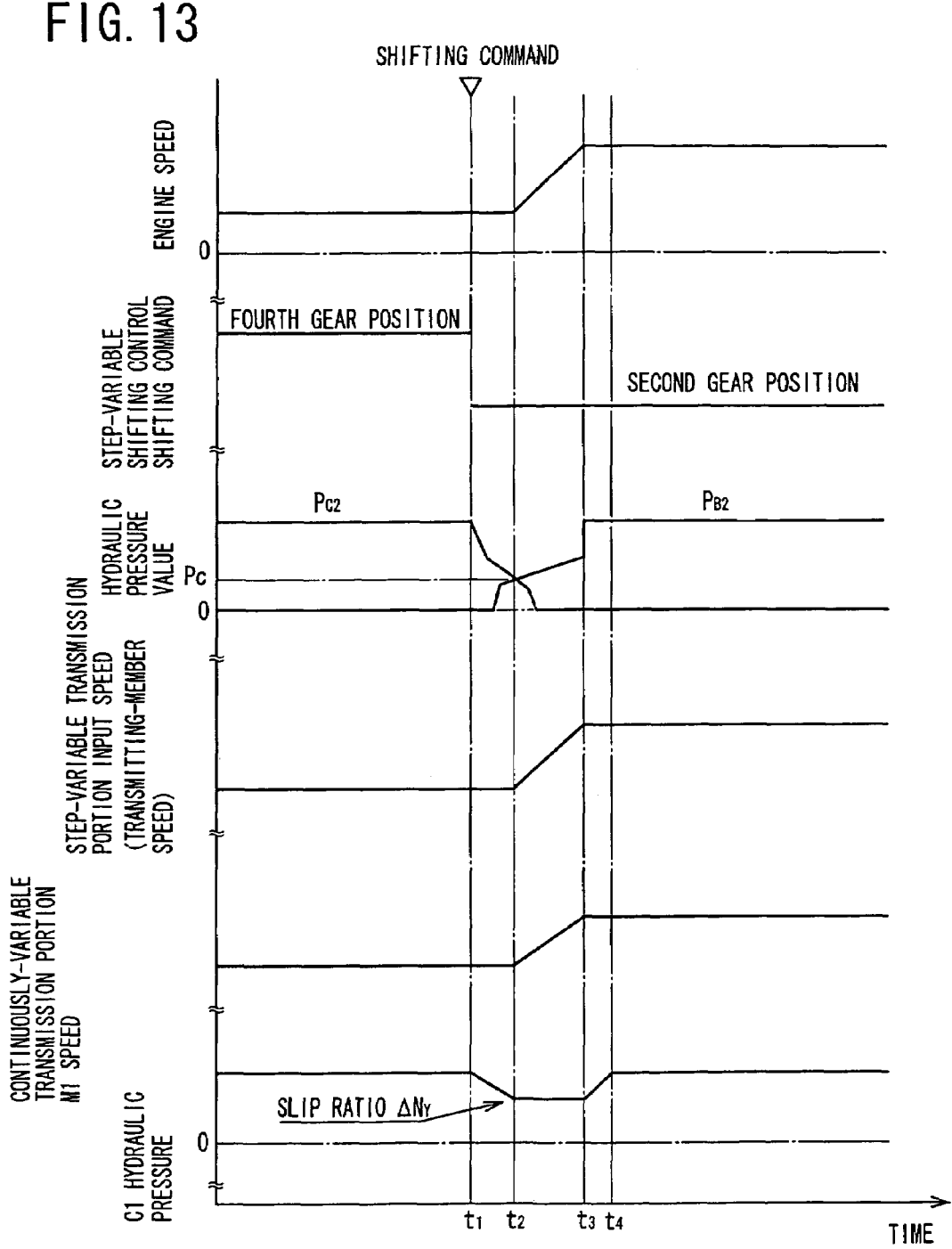
FIG. 13 is a time chart for explaining the control operation illustrated in the flow chart of FIG. 11, when the automatic transmission portion is commanded to effect a stepping shift-down action from a fourth gear position to the second gear position while the differential portion is placed in the continuously-variable shifting state.

The time chart of FIG. 13 explains the control operation illustrated in the flow chart of FIG. 11, when the automatic transmission portion 20 is commanded to effect a stepping shift-down action from the fourth gear position to the second gear position while the differential portion 11 is placed in the continuously-variable shifting state.

Figure 14:
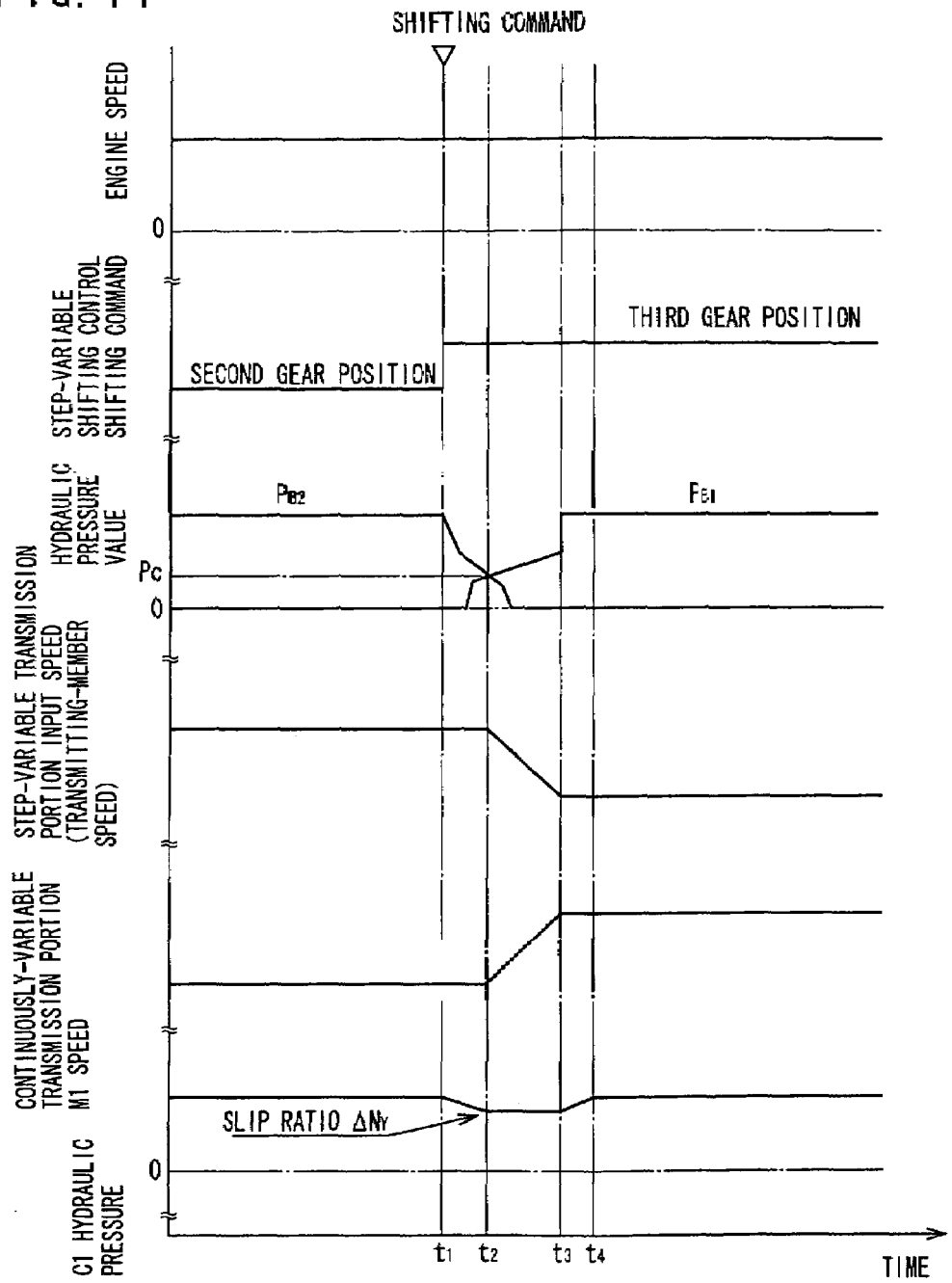
FIG. 14 is a time chart for explaining the control operation illustrated in the flow chart of FIG. 11, when the automatic transmission portion is commanded to effect the shift-up action from the second gear position to the third gear position while the differential portion is placed in the continuously-variable shifting state.

The time chart of FIG. 14 explains the control operation illustrated in the flow chart of FIG. 11, when the automatic transmission portion 20 is commanded to effect the shift-up action from the second gear position to the third gear position while the differential portion 11 is placed in the continuously-variable shifting state.

The control routine is initiated with step S1 ("steps" being hereinafter omitted) corresponding to the shifting-initiation determining means 80 or a shifting-initiation determining step, to determine whether a shifting action of the automatic transmission portion 20 under the control of the step-variable shifting control means 54 is initiated or not.

At a point of time $t_1$ indicated in FIG. 12 and FIG. 14, a shift-up action of the automatic transmission portion 20 from the second gear position to the third gear position is determined, and a shifting command to shift up the automatic transmission portion 20 to the third gear position is generated. At a point of time t1 indicated in FIG. 13, a shift-down action of the automatic transmission portion 20 from the fourth gear position to the second gear position is determined, and a shifting command to shift down the automatic transmission portion 20 to the second gear position is generated.

When an affirmative decision is obtained in S1, the control flow goes to S2 corresponding to the locked-state determining means 84 or a locked-state determining step, to determine whether the power distributing mechanism 16 is placed in the non-differential state (locked state) or not, that is, whether the differential portion 11 is placed in the non-continuously-variable shifting state (step-variable shifting state or not. This determination as to whether the differential portion 11 is placed in the step-variable shifting state is made by determining whether the vehicle condition is in the step-variable shifting region which is defined by the switching control map of FIG. 6 shown in FIG. 6 by way of example and in which the transmission mechanism 10 should be placed in the step-variable shifting state.

At the point of time $t_1$ indicated in FIG. 12, a determination that the differential portion 11 (continuously-variable portion) is placed in the step-variable shifting state (locked state) is made.

At the point of time t1 indicated in FIG. 13 and FIG. 14, a determination that the differential portion (continuously-variable portion) is placed in the continuously-variable shifting state (differential state).

When an affirmative decision is made in S2, the control flow goes to S3 corresponding to the input-clutch control means 82 or an input-clutch control step, to temporarily reduce the torque capacity of the input clutch (first clutch C1). For example, the hydraulic control unit 42 is supplied with a command to temporarily reduce the engaging pressure of the input clutch in its engaging action for a predetermined period which is obtained by experimentation to reduce the influence of the variation of the engine torque $T_E$, in other words, to temporarily increase the slip ratio ΔN of the input clutch to the slip ratio $\Delta N_Y$ for the step-variable shifting state, for the predetermined period.

During a time period from the point of time $t_1$ to a point of time $t_4$ indicated in FIG. 12, the hydraulic pressure of the first clutch C1 is temporarily reduced to establish the predetermined slip ratio $\Delta N_Y$.

When a negative decision is obtained in S2, the control flow goes to S5 corresponding to the speed-ratio-change determining means 86 or a speed-ratio-change determining step, to determine whether the shifting action causes a change of the overall speed ratio γT by an amount larger than the predetermined threshold, to determine whether the shifting action causes a non-continuous change of the overall speed ratio γT, that is, a change of the overall speed ratio γT in steps so-called "stepping change".

When an affirmative decision is obtained in S5, the control flow goes to S6 corresponding to the input-clutch control means 86 or the input-clutch control step, to temporarily reduce the torque capacity of the input clutch (first clutch C1). For example, the hydraulic control unit 42 is supplied with a command to temporarily reduce the engaging pressure of the input clutch in its engaging action for a predetermined period which is obtained by experimentation to reduce the influence of the variation of the engine torque $T_E$, in other words, to temporarily increase the slip ratio ΔN of the input clutch to the slip ratio $\Delta N_{M2}$ for the stepping change, for the predetermined period.

During a time period from the point of time $t_1$ to a point of time $t_4$ indicated in FIG. 13, the hydraulic pressure of the first clutch C1 is temporarily reduced to establish the predetermined slip ratio $\Delta N_{M2}$.

When a negative decision is obtained in S5, the control flow goes to S7 corresponding to the hybrid control means 52 or a hybrid control step, to control the speed ratio of the differential portion 11 such that the overall speed ratio γT is continuously changed during the shifting action, for example, such that the engine speed $N_E$ is held substantially constant, so that the shifting shock is reduced and the fuel economy is improved.

Then, the control flow goes to S8 corresponding to the input-clutch control means 82 or input-clutch control step, to temporarily reduce the torque capacity of the input clutch (first clutch C1). For example, the hydraulic control unit 42 is supplied with a command to temporarily reduce the engaging pressure of the input clutch in its engaging action for a predetermined period which is obtained by experimentation to reduce the influence of the variation of the engine torque $T_E$, in other words, to temporarily increase the slip ratio ΔN of the input clutch to the slip ratio $\Delta N_M$ for the continuously-variable shifting state, for the predetermined period.

During a time period from the point of time $t_1$ to a point of time $t_4$ indicated in FIG. 14, the hydraulic pressure of the first clutch C1 is temporarily reduced to establish the predetermined slip ratio $\Delta N_M$.

The above-indicated S3, S6 or S8 is followed by S4 corresponding to the step-variable shifting control means 54 or a step-variable shifting control step, to implement the shifting action of the automatic transmission portion 20 according to the shifting command generated in S1.

During a time period from the point of time $t_1$ to a point of time $t_3$ indicated in FIG. 12 and FIG. 14, a hydraulic pressure $P_{B2}$ of the releasing-side coupling device in the form of the second brake B2 is reduced, while a hydraulic pressure $P_{B1}$ of the engaging-side coupling device in the form of the first brake B1 is increased, such that the reduction of the hydraulic pressure $P_{B2}$ is initiated at the point of time $t_1$, such that the engaging action of the first brake B1 is completed at the point of time $t_3$, so that the shifting action of the automatic transmission portion 20 is completed. The transient hydraulic pressure of the releasing-side coupling device and the transient hydraulic pressure of the engaging-side coupling device during the time period from the point of time $t_1$ to the point of time $t_3$ are determined such that the transmitting-member speed $N_{18}$ changes in the predetermined state.

In the example of FIG. 12 in which the shift-up action takes placed in the locked state of the differential portion 11 with the switching clutch C0 placed in its engaged state, the transmission mechanism 10 as a whole functions as a step-variable transmission. Therefore, the shift-up action causes a decrease of the engine speed $N_E$ as well as a decrease of the input speed $N_{IN}$ of the automatic transmission portion 20 (transmitting member speed $N_{18}$) during a time period from the point of time $t_2$ to the point of time, $t_3$, if the vehicle speed V is held constant.

During a time period from a point of time $t_2$ to a point of time t3 indicated in FIG. 14, the first electric motor speed $N_{M1}$ is controlled by the differential function of the differential portion 11, to change the speed ratio of the differential portion 11 by an amount equal to an amount of change of the speed ratio of the automatic transmission portion 20, in a direction opposite to the direction of change of the speed ratio of the automatic transmission portion 20, during the inertia phase of the shifting action of the automatic transmission portion 20, so that the engine speed $N_E$ is held substantially constant during the shifting action of the automatic transmission portion 20.

During a time period from the point of time $t_1$ to a point of time $t_3$ indicated in FIG. 13, a hydraulic pressure $P_{C2}$ of the releasing-side coupling device in the form of the second clutch C2 is reduced, while a hydraulic pressure $P_{B2}$ of the engaging-side coupling device in the form of the second brake B2 is increased, such that the reduction of the hydraulic pressure $P_{C2}$ is initiated at the point of time $t_1$, such that the engaging action of the second brake B2 is completed at the point of time $t_3$, so that the shifting action of the automatic transmission portion 20 is completed. The transient hydraulic pressure of the releasing-side coupling device and the transient hydraulic pressure of the engaging-side coupling device during the time period from the point of time $t_1$ to the point of time $t_3$ are determined such that the transmitting-member speed $N_{18}$ changes in the predetermined state.

In the example of FIG. 13, the first motor speed NM1 is increased while the engine $N_E$ is increased with an increase of the speed ratio $\gamma 0$ of the differential portion 11, after a point of time $t_2$. In the process of the shift-down action of the automatic transmission portion 20, the input speed $N_{IN}$ (transmitting-member speed $N_{18}$) is increased. The speed ratio of the differential portion 11 is controlled by using at least the first electric motor M1 while utilizing the differential function of the differential portion 11, so that the overall speed ratio $\gamma T$ is eventually adjusted to the target value, as a result of control of the speed ratio of the differential portion 11. Thus, in this case where the shifting action causes the stepping change of the overall speed ratio $\gamma T$, the speed ratio of the differential portion 11 is controlled without synchronization with the shifting action of the automatic transmission portion 20, so that the overall speed ratio $\gamma T$ is changed non-continuously (in steps) toward the target value, for changing the engine speed $N_E$ to a value corresponding to the gear position established by the shifting action, while utilizing a stepping change of the speed ratio of the automatic transmission portion 20, whereby the shifting response is improved.

As is apparent from FIGS. 12-14, the slip ratio $\Delta N$ of the input clutch (first clutch C1) which is temporarily increased during the time period from the first point of time $t_1$ to the fourth point of time $t_4$ is determined such that the slip ratio $\Delta N_Y$ for the step-variable shifting state is the highest, while the slip ratio $\Delta N_M$ for the continuously-variable shifting state is the lowest. The slip ratio $\Delta N_Y$ used in the step-variable shifting state of the differential portion 11, the slip ratio $\Delta N_{M2}$ used in the case of the stepping change of the overall speed ratio in the continuously-variable shifting state of the differential portion 11, and the slip ratio $\Delta N_M$ in the case of the continuous change of the overall speed ratio in the continuously-variable shifting state of the differential portion 11 are determined so that the shifting shock due to the variation of the engine torque $T_E$ during the shifting action 20 is almost the same in the above-indicated three cases.

When a negative decision is obtained in S1, the control flow goes to S9 in which various controls other than those to be implemented upon a shifting action of the automatic transmission portion 20 are implemented by various control means of the control device 40.

In the present embodiment described above, the differential portion 11 is switched between the continuously-variable shifting state and the non-continuously-variable shifting state, for example, by the switching clutch C0 and the switching brake B0 which function as the differential limiting device operable to limit the operation of the differential portion 11 as the electrically controlled differential device. Accordingly, the drive system has both an advantage of improved fuel economy of a transmission the speed ratio of which is electrically variable, and an advantage of high power transmitting efficiency of a gear type power transmitting device arranged to mechanically transmit the drive force.

The fuel economy is improved when the differential portion 11 is placed in the continuously-variable shifting state while the vehicle is running at a low or medium speed or output with the engine operating in a normal output state, for example. When the differential portion 11 is placed in the step variable shifting state for transmitting the output of the engine 8 to the drive wheels primarily through a mechanical power transmitting path while the vehicle is running at a high speed, on the other hand, the fuel economy is improved owing to reduction of a loss of conversion between mechanical and electric energies, which would take place when the vehicular drive system is operated as the transmission the speed ratio of which is electrically variable. The differential portion 11 is placed in the non-continuously-variable shifting state while the vehicle is running at a high output. That is, the vehicular drive system is operated as the transmission the speed ratio of which is electrically variable, only when the vehicle is running at the low or medium speed or output, making it possible to reduce the maximum amount of electric energy that can be generated by the electric motor, namely, the maximum amount of electric energy that should be supplied from the first electric motor M1, whereby the required size of the electric motor and the required size of the vehicular drive system including the electric motor can be further reduced.

The present embodiment is further arranged such that the input-clutch control means 82 is operable to reduce the torque capacity of the input clutch (first clutch C1), during a shifting action of the automatic transmission portion 20, for limiting the torque to be transmitted to the automatic transmission portion 20, to a value not larger than a predetermined value. Therefore, when the engine torque $T_E$ exceeds a maximum torque that can be transmitted through the input clutch, a difference of the engine torque $T_E$ with respect to the maximum torque is not transmitted to the automatic transmission portion 20, so that an influence of a variation of the engine torque $T_E$ on the shifting action of the automatic transmission portion 20 is reduced. Stated from another point of view, the input clutch operates as a limiter operable upon the variation of the engine torque $T_E$ during the shifting action of the automatic transmission portion 20, making it possible to reduce the influence of the variation of the engine torque $T_E$ on the shifting action of the automatic transmission portion 20. Accordingly, the shifting shock of the automatic transmission portion 20 during its shifting action can be reduced.

The present embodiment is further arranged such that input-clutch control means 82 changes an amount of reduction of the torque capacity of the input clutch (first clutch C1), depending upon whether the differential portion 11 is placed in the step-variable shifting state or not. That is, the amount of reduction of the torque capacity of the input clutch is controlled depending upon whether the differential portion 11 is placed in the continuously-variable shifting state in which the amount of variation of the torque to be transmitted to the power transmitting member 18 can be reduced irrespective of the variation of the engine torque $T_E$, or in the step-variable shifting state in which the continuously-variable transmission portion is not operable to perform the electrically controlled continuously variable shifting operation and in which the engine torque $T_E$ is transmitted to the power transmitting member 18 primarily through the mechanical power transmitting path, so that the amount of variation of the torque to be transmitted to the power transmitting member 18 cannot be reduced.

The present embodiment is further arranged such that the input-clutch control means 82 changes the amount of reduction of the torque capacity of the input clutch (first clutch C1), depending upon whether the overall speed ratio γT while the differential portion 11 is placed in the continuously-variable shifting state is changed continuously or non-continuously during the shifting action of the automatic transmission portion 20. Accordingly, the amount of reduction of the torque capacity of the input torque is controlled according to an inertia torque which changes depending upon whether the overall speed ratio γT has a continuous change which restricts a variation of the engine speed $N_E$ during the shifting action of the automatic transmission portion 20, or a non-continuous change (stepping change) which causes a variation of the engine speed $N_E$ during the shifting action.

The present embodiment is further arranged such that the input-clutch control means 82 changes the amount of reduction of the torque capacity of the input clutch (first clutch C1), according to a variation of the engine torque $T_E$, so that the shifting shock of the automatic transmission portion 20 during its shifting action can be made smaller than where the torque transmitted by the input clutch is reduced irrespective of the engine torque.

In the present embodiment, the input clutch (first clutch C1) is not the releasing-side coupling device or the engaging-side coupling device which is used to effect the shifting action of the automatic transmission portion 20. Accordingly, the automatic transmission portion 20 is shifted by a releasing action of the releasing-side coupling device and an engaging action of the engaging-side coupling device, so that the influence of the variation of the engine torque $T_E$ on the shifting action of the automatic transmission portion is adequately reduced.

The other embodiments of the present invention will be described. In the following descriptions, the same reference as used in the preceding embodiment signs will be used to identify the corresponding elements which will not be described.

Embodiment 2

Figures 15, 16:
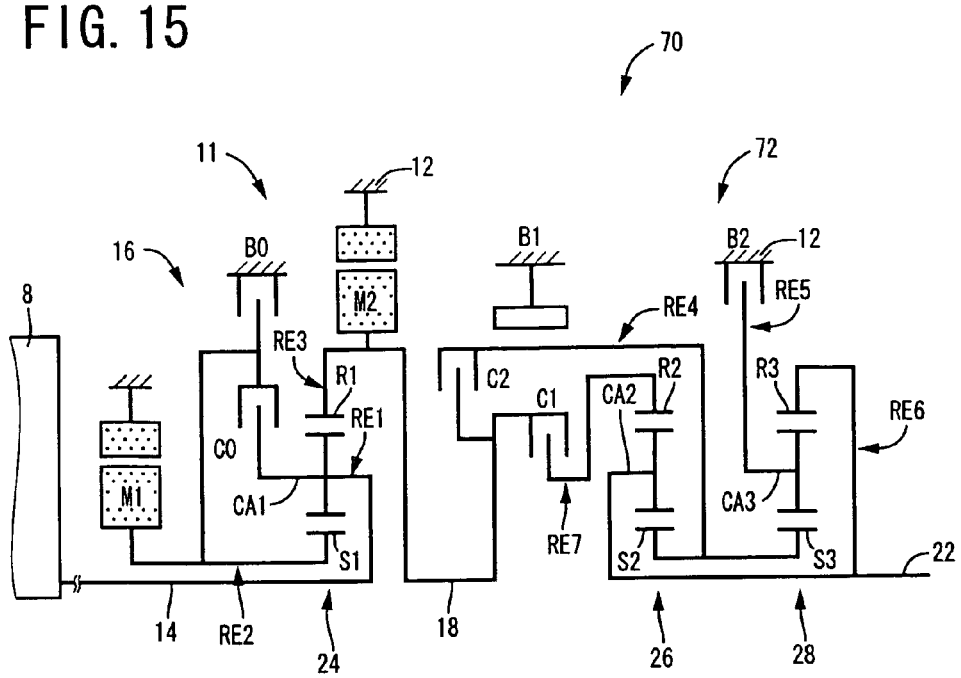
FIG. 15 is a schematic view corresponding to that of FIG. 1, showing an arrangement of another hybrid vehicle drive system to which the present invention is also applicable.
FIG. 16 is a table corresponding to that of FIG. 2, indicating shifting actions of the hybrid vehicle drive system of FIG. 15, which is operable in a selected one of the continuously-variable and step-variable shifting states, in relation to different combinations of operating states of hydraulically operated frictional coupling devices to effect the respective shifting actions.
Figure 17:
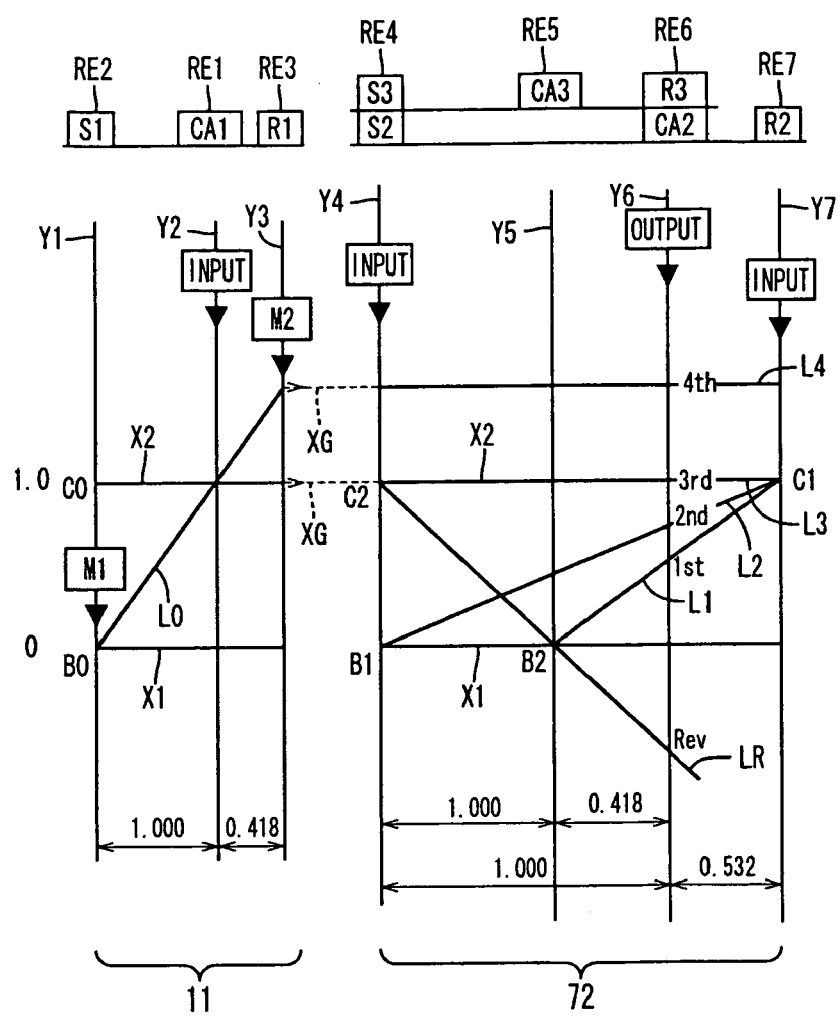
FIG. 17 is a collinear chart corresponding to that of FIG. 3, indicating relative rotating speeds of the rotary elements of the hybrid vehicle drive system of FIG. 15 in the step-variable shifting state, in the different gear positions.

FIG. 15 is a schematic view for explaining an arrangement of a transmission mechanism 70 in another embodiment of this invention, and FIG. 16 a table indicating a relationship between the gear positions of the transmission mechanism 70 and different combinations of engaged states of the hydraulically operated frictional coupling devices for respectively establishing those gear positions, while FIG. 17 is a collinear chart for explaining a shifting operation of the transmission mechanism 70.

The transmission mechanism 70 includes the differential portion 11 having the first electric motor M1, power distributing mechanism 16 and second electric motor M2, as in the preceding embodiment. The transmission mechanism 70 further includes an automatic transmission portion 72 having three forward drive positions. The automatic transmission portion 72 is disposed between the differential portion 11 and the output shaft 22 and is connected in series to the differential portion 11 and output shaft 22 through the power transmitting member 18. The power distributing mechanism 16 includes the single-pinion type first planetary gear set 24 having a gear ratio ρ1 of about 0.418, for example, and the switching clutch C0 and the switching brake B0. The automatic transmission portion 72 includes the single-pinion type second planetary gear set 26 having a gear ratio ρ2 of about 0.532, for example, and the single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

Figure 18:
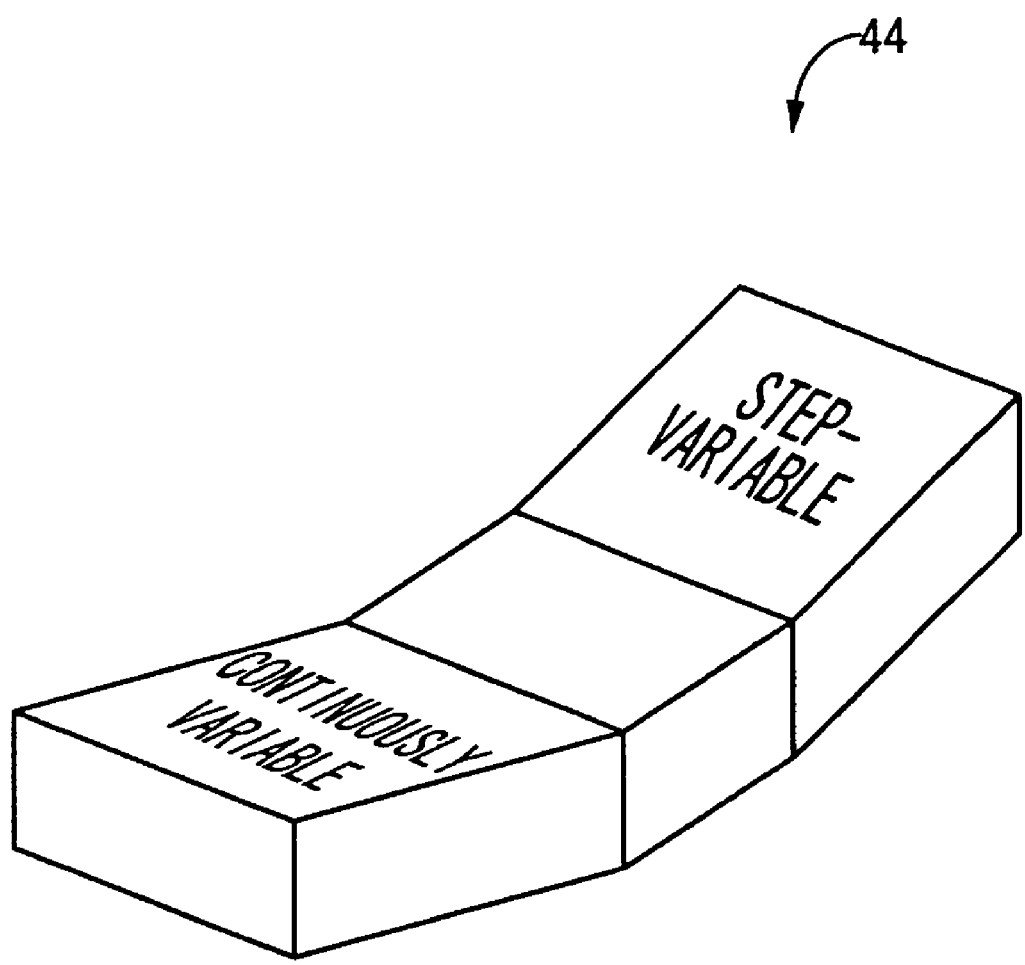
FIG. 18 is a perspective view showing an example of a manually operable shifting-state selecting device in the form of a seesaw switch operated by a user to select the shifting state.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 18. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 20, and the differential portion 11 which is placed in the fixed-speed-ratio shifting state by engagement of the switching clutch C0 or switching brake B0. Further, a continuously variable transmission is constituted by the transmission portion 20, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 0.1.531, for example, which is lower than the speed ratio γ1, is established by engaging actions of the switching clutch C0, first clutch C1 and first brake B1, as indicated in FIG. 18. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 16, so that the differential portion 11 functions as the continuously variable transmission, while the automatic transmission portion 72 connected in series to the differential portion 11 functions as the step-variable transmission, whereby the input speed $N_{IN}$ of the automatic transmission portion 72 placed in one of the first through third gear positions, namely, the transmitting member speed $N_{18}$ when the automatic transmission portion 72 is placed in one of the first through fourth gear positions is continuously changed, so that the speed ratio of the transmission mechanism 10 when the automatic transmission portion 72 is placed in one of those gear positions is continuously variable over a predetermined range. Accordingly, the total speed ratio of the automatic transmission portion 72 is continuously variable across the adjacent gear positions, whereby the overall speed ratio γT of the transmission mechanism 70 a whole is continuously variable.

The collinear chart of FIG. 17 indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart of FIG. 21 indicates the rotating speeds of the individual elements of the power distributing mechanism 16 when the switching clutch C0 and brake B0 are both released, and the rotating speeds of those elements when the switching clutch C0 or brake B0 is engaged, as in the preceding embodiment, except in that the third rotary element RE3 (first ring gear R1) is connected to the power transmitting member 18 and the second electric motor M1.

In FIG. 17, four vertical lines Y4, Y5, Y6 and Y7 corresponding to the automatic transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 17. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the differential portion 11. When the switching clutch B0 is engaged in place of the switching clutch C0, the sixth rotary element RE6 is rotated at a speed higher than the engine speed $N_E$, with the drive force received from the differential portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the differential portion 11 functioning as the continuously-variable shifting portion or first shifting portion, and the automatic transmission portion 72 functioning as the step-variable (automatic) shifting portion or second shifting portion, and the output shaft 22 is provided with the third electric motor M3, so that the present transmission mechanism 70 has advantages similar to those of the first embodiment.

Embodiment 3

FIG. 18 shows an example of a seesaw switch 44 (hereinafter referred to as "switch 44") functioning as a shifting-state selecting device manually operable to select the differential state (non-locked state) and or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The switch 44 has a continuously-variable-shifting running button labeled "STEP-VARIABLE" for running of the vehicle in the continuously-variable shifting state, and a step-variable-shifting running button labeled "CONTINUOUSLY-VARIABLE" for running of the vehicle in the step-variable shifting state. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10 may be switched by a manual operation of the switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

Where the shifting state of the transmission mechanism 10 is not automatically selected, but is manually selected by a manual operation of the switch 44, step S3 in the flow chart of FIG. 11 is formulated such that the determination as to whether the power distributing mechanism 16 is placed in the differential state, that is, whether the differential portion 11 is placed in the continuously-variable shifting state, is effected depending upon whether the switch 44 has been operated to select the differential state of the power distributing mechanism 16 or the continuously-variable shifting state of the transmission mechanism 10.

While the preferred embodiments of this invention have been described in detail by reference to the accompanying drawings, it is to be understood that the present invention may be otherwise embodied.

In the embodiments described above, the transmission mechanism 10 is provided with the differential portion 11 and the automatic transmission portion 20. However, the present invention is applicable to a transmission mechanism not provided with the differential portion 11. In this case, the locked-state determining means 54 and the speed-ratio-change determining means 86 for determining whether the shifting action in the continuously-variable shifting state causes a stepping change of the overall speed ratio or not, need not be provided, and the input-clutch control means 82 need not change the slip ratio ΔN of the input clutch depending upon whether the step-variable shifting state is established or not, or depending upon whether the shifting action causes the stepping change of the overall speed ratio or not.

In the illustrated embodiments, the power distributing mechanism 16 is switchable between the differential state and the non-differential state, so that the transmission mechanism 10, 70 is switchable between the continuously-variable shifting state in which the transmission mechanism functions as an electrically controlled continuously variable transmission, and the step-variable shifting state in which the transmission mechanism functions as a step-variable transmission. However, the transmission mechanism 10, 70 need not be switchable to the step-variable shifting state. That is, the principle of the present invention is applicable to a transmission mechanism wherein the differential portion (differential portion) 11 is not provided with the switching clutch C0 and the switching brake B0, and functions simply as an electrically controlled continuously variable transmission (electrically controlled differential device). In this case, the locked-state determining means 84, switching control means 50 and the high-speed-gear determining means 62 need not be provided, and the input-clutch control means 82 need not be arranged to change the slip ratio ΔN of the input clutch, depending upon whether the step-variable shifting state is established or not.

In the embodiments described above, the input-clutch control means 82 is arranged to change the slip ratio ΔN of the input clutch depending upon whether the step-variable shifting state is established or not, or depending upon whether the shifting action causes a stepping change of the overall speed ratio or not, the input-clutch control means 82 may be modified to change the slip ratio ΔN, irrespective of whether the step-variable shifting state is established or not, or whether the shifting action causes the stepping change of the overall speed ratio or not. This modification also follows the principle of the present invention. When the continuously-variable shifting state is established, particularly where the shifting action does not cause a stepping change of the overall speed ratio, the amount of variation of the engine torque $T_E$ to be transmitted to the power transmitting member 18 is reduced by the hybrid control means 52, so that it is not necessary to temporarily reduce the ratio of engagement of the input clutch. Namely, the ratio of engagement of the input clutch may be temporarily reduced by controlling the slip ratio ΔN to a predetermined value only when the step-variable shifting state is established.

While the embodiments described above are arranged such that the input-clutch control means 82 changes (or sets) the amount of reduction of the torque capacity or the slip ratio ΔN of the input clutch according to the amount of variation of the engine torque $T_E$ or the number of the operating cylinders of the engine 8, the amount of reduction of the torque capacity or the slip ratio ΔN of the input torque may be changed or set according to various other conditions. For instance, the amount of reduction of the torque capacity may be controlled to a predetermined optimum value, that is, the slip ratio ΔN of the input clutch may be controlled to a predetermined optimum value ΔN', which optimum value is obtained by experimentation for each of the different shifting actions of the automatic transmission portion 20, 72 (such as the shift-up action from the first gear position to the second gear position and the shift-up action from the second gear position to the third gear position), since the different shifting actions are effected by respective different combinations of the coupling devices (clutches C and brakes B), which have different torque capacity characteristics and torque bearing ratios and which are controlled by respective hydraulic control valves that have respective different control gains.

In the embodiments described above, the speed ratio of the differential portion 11 is controlled such that the engine speed $N_E$ is held substantially constant during the shifting action of the automatic transmission portion 20, as indicated in the time chart of FIG. 14, that is, so as to prevent a change of the overall speed ratio of the transmission mechanism 10. However, the speed ratio of the differential portion 11 need not be controlled to hold the engine speed $N_E$ substantially constant, but may be controlled so as to reduce the amount of variation of the engine speed $N_E$ for thereby permitting a continuous change of the overall speed ratio γT. This modification also follows the principle of the present invention.

In the embodiments described above, the lock-state determining means 84 (step S2 of FIG. 11) is arranged to make the determination as to whether the power distributing mechanism 16 is placed in the non-differential state (locked state) or not, by determining whether the vehicle condition is in the step-variable shifting region defined by the switching map shown in FIG. 6 by way of example. However, the determination may be made on the basis of the determination by the switching control means 50 as to whether the operating state of the transmission mechanism 10 is in the step-variable shifting region or the continuously-variable shifting region.

In the embodiments described above, the speed-ratio-change determining means 86 (step S5 of FIG. 11) is arranged to determine a stepping change of the overall speed ratio γT, if the amount of change of the target value of the overall speed ratio γT is larger than the predetermined threshold. However, the stepping change of the overall speed ratio γT may be determined if the rate of change of the target value of the overall speed ratio γT is higher than a predetermined threshold. The threshold of the rate of change of the target value of the overall speed ratio γT is obtained by experimentation as the rate above which the change of the target value is not considered continuous (that is, considered non-continuous).

The switching control means 50 in the embodiments described above is arranged to switch the differential portion 11 to the non-differential state (locked state) in which the differential portion 11 does not perform the differential function, with the switching clutch C0 or switching brake B0 held in its fully engaged state, so that the operation of the differential portion 11 as the electrically controlled continuously variable transmission (as the differential device) is limited. However, the operation of the differential portion as the electrically controlled continuously variable transmission may be limited by controlling the torque capacity of the switching clutch C or the switching brake B0, for instance, by holding the switching clutch C0 or brake B0 in its partially engaged state. Described in detail, the switching control means 50 may be arranged to place the switching clutch C0 or switching brake B0 in its partially engaged state, while permitting the operation of the differential portion 11 as the electrically controlled continuously variable transmission (as the differential device), so that a torque generated by the first electric motor M1 and a partial-engagement torque generated by the switching clutch C0 or brake B0 in its partially engaged state cooperate to constitute a reaction torque with respect to the engine torque $T_E$.

The arrangement described above permits a difference of the engine torque $T_E$ with respect to the maximum torque value TE1 that can be received by the torque capacity of the first electric motor M1 can be transmitted to the differential portion 11, so that the output of the differential portion 11 can be increased without having to increase the maximum torque capacity of the first electric motor M1, namely, without having to increase the required size of the first electric motor M1.

Unlike the releasing action of the switching clutch C0 or switching brake B0, the partial engaging action of the switching clutch C0 or brake B0 eliminates a need of the first electric motor M1 to receive the reaction torque with respect to the entire engine torque $T_E$ to be transmitted to the differential portion 11, so that the ratio of a portion of the engine torque $T_E$ which portion is received by the first electric motor M1, to the engine torque $T_E$ transmitted to the differential portion 11, can be reduced. Accordingly, the size of the first electric motor M1 can be reduced, and/or the durability of the first electric motor M1 can be improved, or the amount of electric energy to be supplied from the first electric motor M1 to the second electric motor M2 can be reduced, whereby the durability of the second electric motor M2 can also be improved.

Further, the switching control means 50 may be arranged to place the switching clutch C0 or switching brake B0 in its partially engaged state, irrespective of whether the vehicle condition is in the continuously-variable shifting region in which the differential portion 11 should be placed in the continuously-variable shifting state, or in the step-variable shifting region in which the differential portion 11 should be placed in the step-variable shifting state.

In the illustrated embodiments, the transmission mechanism 10, 70 is switchable between its continuously-variable shifting state and the step-variable shifting states by placing the continuously-variable transmission portion 11 (power distributing mechanism 16) selectively in one of its differential state in which the continuously-variable transmission portion 11 is operable as the electrically controlled continuously variable transmission, and the non-differential state (locked state) in which the continuously-variable transmission portion 11 is not operable as the electrically controlled continuously variable transmission. However, the continuously-variable transmission portion 11 placed in its differential state can be operable as the step-variable transmission the speed ratio of which is variable in steps rather than continuously. In other words, the differential and non-differential states of the continuously-variable transmission portion 11 do not respectively correspond to the continuously-variable and step-variable shifting states of the transmission mechanism 10, 70, and therefore the continuously-variable transmission portion 11 need not be switchable between the continuously-variable and step-variable shifting states. The principle of this invention is applicable to any transmission mechanism which is switchable between the differential and non-differential states, or wherein the continuously-variable transmission portion 11 (power distributing mechanism 16) is switchable between the differential and non-differential states. In the step-variable shifting state, the vehicle drive force is transmitted primarily through the mechanical power transmitting path, and not through the electric path.

In the embodiments described above, the first clutch C1 or the second clutch C2 which is a part of the automatic transmission portion 20, 72 is used as the input clutch operable to place the power transmitting path between the engine 8 and the automatic transmission portion 20, 72, selectively in the power transmitting state and the power cut-off state. The input clutch need not be the first clutch C1 or the second clutch C2, provided at least one coupling device is provided to place the power transmitting path selectively in the power transmitting state and the power cut-off state. For example, the at least one coupling device used as the input clutch need not constitute a part of the automatic transmission portion 20, 72, and may be disposed separately from the automatic transmission portion 20, 72, in a power transmitting path between the differential portion 11 and the first clutch C1 or the second clutch C2, or in a power transmitting path between the engine 8 and the differential portion 11.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18 or output shaft 20, respectively, through gears or belts. While the second electric motor M2 is connected to the power transmitting member 18, the second electric motor M2 may be connected to the output shaft 30, or to any rotary member of the automatic transmission portion 20, 72. The power transmitting path between the power transmitting member 18 and the drive wheels may include gears, a belt or speed reducing device through which the second electric motor M2 is connected to the power transmitting member 18 or output shaft 22.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the embodiments described above, the automatic transmission portion 20, 72 is a step-variable transmission arranged to perform clutch-to-clutch shifting actions each of which is effected by a releasing action of one coupling device and an engaging action of another coupling device. However, one-way clutch may be provided in place of at least one of those coupling devices in the form of the clutches C and brakes B, or in addition to at least one of those coupling devices such that the one-way clutch is parallel to the clutch or brake, so that the step-variable transmission performs one-way clutch shifting actions. The principle of the present invention is also applicable to the vehicular drive system provided with this type of step-variable transmission.

While the automatic transmission portion 20, 72 in the preceding embodiments is connected in series to the differential portion 11 through the power transmitting member 18, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine, and a pair of bevel gears which are respectively operatively connected to the first and second electric motors M1, M2.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear set is not limited to a single-pinion type, but may be a double-pinion type.

The shifting device 46 in the illustrated embodiments is provided with the shift lever 48 for selecting a plurality of shift positions. However, the shift lever 48 may be replaced by a pushbutton switch, a slide type switch or any other switch for selecting a plurality of shift positions, a device operable to select a plurality of shift positions in response to a voice of the vehicle operator rather than a manual operation of the vehicle operator, or a device operable to select a plurality of shift positions in response to a foot operation of the vehicle operator. When the shift lever 48 is placed in the position M, the number of the selectable gear positions can be selected. However, the highest gear position selectable can be selected by the shift lever 92 placed in the position M. In this case, the step-variable transmission 20, 72 is shifted when the highest gear position selectable is changed. When the shift lever 48 is manually operated from the position M to the shift-up position "+" or the shift-down position "−", the step-variable transmission 20 is shiftable to any one of the first through fourth gear positions.

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been descried for illustrative purpose only, and that the present invention may be embodied with various changes and modifications which may occur to those skilled in the art.

What is claimed is:

1. A control apparatus for a vehicular drive system provided with a step-variable transmission portion operable to transmit an output of an engine to a drive wheel of a vehicle and functioning as a step-variable transmission, said control apparatus comprising:
   an input clutch operable to permit and inhibit an input of a drive force from said engine to said step-variable transmission portion;
   an input-clutch control portion operable to reduce a torque capacity of said input clutch, during a shifting action of said step-variable transmission portion, for limiting a torque to be transmitted to said step-variable portion, to a value not larger than a predetermined value, and a continuously-variable transmission portion including a differential mechanism operable to distribute an output of the engine to a first electric motor and a power transmitting member, and a second electric motor disposed in a power transmitting path between said power transmitting member and said drive wheel of the vehicle, wherein the continuously-variable transmission portion is operable as an electrically controlled continuously variable transmission, and wherein said step-variable transmission portion is disposed in the power transmitting path between the power transmitting member and the drive wheel.

2. The control apparatus according to claim 1, wherein said input-clutch control portion changes an amount of reduction of the torque capacity of said input clutch, according to a variation of a torque of said engine.

3. The control apparatus according to claim 1, wherein said input clutch is not used to affect the shifting action of said step-variable transmission portion during a state in which an input torque received by the input clutch exceeds the predetermined value.

4. The control apparatus according to claim 1, wherein said differential mechanism is provided with a differential limiting device operable to limit a differential function of said differential mechanism, for thereby limiting an operation of said continuously-variable transmission portion as said electrically controlled continuously variable transmission.

5. The control apparatus according to claim 4, wherein said input-clutch control portion changes an amount of reduction of the torque capacity of said input clutch, depending upon whether the operation of said continuously-variable transmission portion as said electrically controlled continuously variable transmission is limited by said differential limiting device or not.

6. The control apparatus according to claim 1, wherein said input-clutch control portion changes an amount of reduction of the torque capacity of said input clutch, depending upon whether an overall speed ratio defined by a speed ratio of said step-variable transmission portion and a speed ratio of said continuously-variable transmission portion placed in a continuously-variable shifting state in which the continuously-variable transmission portion is operable as said electrically controlled continuously variable transmission is changed continuously or non-continuously during the shifting action of said step-variable transmission portion.

7. The control apparatus according to claim 6, wherein when the shifting action of said step-variable transmission portion causes a stepping change of said overall speed ratio, said input-clutch control portion controls a slip ratio of said input clutch while the shifting action of said step-variable transmission portion is controlled.

8. The control apparatus according to claim 6, wherein when the shifting action of said step-variable transmission portion does not cause a stepping change of said overall speed ratio, said input-clutch control portion controls a slip ratio of said input clutch while the shifting action of said step-variable transmission portion is controlled so as to maintain a speed of said engine.

9. A control apparatus for a vehicular drive system provided with a step-variable transmission portion operable to transmit an output of an engine to a drive wheel of a vehicle and functioning as a step-variable transmission, said control apparatus comprising:

an input clutch operable to permit and inhibit an input of a drive force from said engine to said step-variable transmission portion;

an input-clutch control portion operable to control a slipping action of said input clutch during a shifting action of said step-variable transmission portion; and a continuously-variable transmission portion including a differential mechanism operable to distribute an output of the engine to a first electric motor and a power transmitting member, and a second electric motor disposed in a power transmitting path between said power transmitting member and said drive wheel of the vehicle, wherein the continuously-variable transmission portion is operable as an electrically controlled continuously variable transmission, and wherein said step-variable transmission portion is disposed in the power transmitting path between the power transmitting member and the drive wheel.

10. The control apparatus according to claim 9, wherein said input-clutch control portion changes an amount of reduction of a torque capacity of said input clutch, according to a variation of a torque of said engine.

11. The control apparatus according to claim 9, wherein said input clutch is not used to affect the shifting action of said step-variable transmission portion during a state in which an input torque received by the input clutch exceeds a predetermined value.

12. The control apparatus according to claim 9, wherein said differential mechanism is provided with a differential limiting device operable to limit a differential function of said differential mechanism, for thereby limiting an operation of said continuously-variable transmission portion as said electrically controlled continuously variable transmission.

13. The control apparatus according to claim 12, wherein said input-clutch control portion changes an amount of reduction of a torque capacity of said input clutch, depending upon whether the operation of said continuously-variable transmission portion as said electrically controlled continuously variable transmission is limited by said differential limiting device or not.

14. The control apparatus according to claim 9, wherein said input-clutch control portion changes an amount of reduction of a torque capacity of said input clutch, depending upon whether an overall speed ratio defined by a speed ratio of said step-variable transmission portion and a speed ratio of said continuously-variable transmission portion placed in a continuously-variable shifting state in which the continuously-variable transmission portion is operable as said electrically controlled continuously variable transmission is changed continuously or non-continuously during the shifting action of said step-variable transmission portion.

15. The control apparatus according to claim 14, wherein when the shifting action of said step-variable transmission portion causes a stepping change of said overall speed ratio, said input-clutch control portion controls a slip ratio of said input clutch while the shifting action of said step-variable transmission portion is controlled.

16. The control apparatus according to claim 14, wherein when the shifting action of said step-variable transmission portion does not cause a stepping change of said overall speed ratio, said input-clutch control portion controls a slip ratio of said input clutch while the shifting action of said step-variable transmission portion is controlled so as to maintain a speed of said engine.

17. A control apparatus for a vehicular drive system provided with a step-variable transmission portion operable to transmit an output of an engine to a drive wheel of a vehicle and functioning as a step-variable transmission, said control apparatus comprising:

an input clutch operable to permit and inhibit an input of a drive force from said engine to said step-variable transmission portion;

an input-clutch control portion operable to enable said input clutch to operate as a torque limiting device during a shifting action of said step-variable transmission portion;

a continuously-variable transmission portion including a differential mechanism operable to distribute an output of the engine to a first electric motor and a power transmitting member, and a second electric motor disposed in a power transmitting path between said power transmitting member and said drive wheel of the vehicle, wherein the continuously-variable transmission portion is operable as an electrically controlled continuously variable transmission, and wherein said step-variable transmission portion is disposed in the power transmitting path between the power transmitting member and the drive wheel.

18. The control apparatus according to claim 17, wherein said input-clutch control portion changes an amount of reduction of a torque capacity of said input clutch, according to a variation of a torque of said engine.

19. The control apparatus according to claim 17, wherein said input clutch is not used to affect the shifting action of said step-variable transmission portion during a state in which an input torque received by the input clutch exceeds a predetermined value.

20. The control apparatus according to claim 17, wherein said differential mechanism is provided with a differential limiting device operable to limit a differential function of said differential mechanism, for thereby limiting an operation of said continuously-variable transmission portion as said electrically controlled continuously variable transmission.

21. The control apparatus according to claim 20, wherein said input-clutch control portion changes an amount of reduction of a torque capacity of said input clutch, depending upon whether the operation of said continuously-variable transmission portion as said electrically controlled continuously variable transmission is limited by said differential limiting device or not.

22. The control apparatus according to claim 17, wherein said input-clutch control portion changes an amount of reduction of the torque capacity of said input clutch, depending upon whether an overall speed ratio defined by a speed ratio of said step-variable transmission portion and a speed ratio of said continuously-variable transmission portion placed in a continuously-variable shifting state in which the continuously-variable transmission portion is operable as said electrically controlled continuously variable transmission is changed continuously or non-continuously during the shifting action of said step-variable transmission portion.

23. The control apparatus according to claim 22, wherein when the shifting action of said step-variable transmission portion causes a stepping change of said overall speed ratio, said input-clutch control portion controls a slip ratio of said input clutch while the shifting action of said step-variable transmission portion is controlled.

24. The control apparatus according to claim 22, wherein when the shifting action of said step-variable transmission portion does not cause a stepping change of said overall speed ratio, said input-clutch control portion controls a slip ratio of said input clutch while the shifting action of said step-variable transmission portion is controlled so as to maintain a speed of said engine.

* * * * *